US012182856B1

(12) United States Patent
Schweinfurth

(10) Patent No.: US 12,182,856 B1
(45) Date of Patent: *Dec. 31, 2024

(54) SYSTEM AND METHOD FOR AUTOMATICALLY REORDERING CONSUMER PRODUCTS

(71) Applicant: WALGREEN CO., Deerfield, IL (US)

(72) Inventor: Andrew David Schweinfurth, Chicago, IL (US)

(73) Assignee: WALGREEN CO., Deerfield, IL (US)

(*) Notice: Subject to any disclaimer, the term of this patent is extended or adjusted under 35 U.S.C. 154(b) by 168 days.

This patent is subject to a terminal disclaimer.

(21) Appl. No.: 17/885,146

(22) Filed: Aug. 10, 2022

Related U.S. Application Data

(63) Continuation of application No. 16/203,202, filed on Nov. 28, 2018, now Pat. No. 11,430,051.

(51) Int. Cl.
*G06Q 30/00* (2023.01)
*G06K 19/077* (2006.01)
*G06Q 30/0282* (2023.01)
*G06Q 30/0601* (2023.01)

(52) U.S. Cl.
CPC ... *G06Q 30/0643* (2013.01); *G06K 19/07758* (2013.01); *G06Q 30/0282* (2013.01); *G06Q 30/0603* (2013.01); *G06Q 30/0631* (2013.01)

(58) Field of Classification Search
CPC ........... G06Q 30/0643; G06Q 30/0282; G06Q 30/0603; G06Q 30/0631; G06K 19/07758
See application file for complete search history.

(56) References Cited

U.S. PATENT DOCUMENTS

| | | | |
|---|---|---|---|
| 8,490,871 B1* | 7/2013 | Miller | H04L 63/0853 235/375 |
| 8,626,530 B1* | 1/2014 | Tran | G16H 40/20 705/2 |
| 9,824,323 B1* | 11/2017 | Weiss | H04W 4/02 |
| 2002/0188499 A1 | 12/2002 | Jenkins et al. | |
| 2003/0126103 A1 | 7/2003 | Chen et al. | |
| 2004/0128214 A1 | 7/2004 | Ishida et al. | |
| 2005/0171856 A1 | 8/2005 | Takahashi et al. | |
| 2005/0288989 A1 | 12/2005 | Kim et al. | |
| 2009/0187489 A1 | 7/2009 | Mallick et al. | |

(Continued)

OTHER PUBLICATIONS

U.S. Patent and Trademark Office Publishes Walgreen Co's Patent Application for System and Method for Express Refill Global IP News. Packaging & Containers Patent News [New Delhi] Dec. 27, 2014. (Year: 2014).*

*Primary Examiner* — Robert M Pond
(74) *Attorney, Agent, or Firm* — MARSHALL, GERSTEIN & BORUN LLP; Randall G. Rueth

(57) ABSTRACT

Systems, methods, and instructions for reordering consumer products can include: (A) receiving an image of a physical depiction of an identification tag, (B) determining the consumer product that corresponds to the identification tag via at least one of: (i) optical character recognition, (ii) universal resource identifier decoding, (iii) object recognition, (iv) quick response code decoding, or (v) barcode decoding, (C) determining a retail location wherein the consumer product is not currently in stock and is expected to be in stock and available for pick-up at the retail location in the future, and (D) automatically initiating the reordering of the consumer product at the retail location.

17 Claims, 14 Drawing Sheets

(56) References Cited

U.S. PATENT DOCUMENTS

| | | | |
|---|---|---|---|
| 2012/0150677 A1* | 6/2012 | Shuster | G06Q 10/087 705/26.1 |
| 2014/0006199 A1 | 1/2014 | Grigg et al. | |
| 2014/0063311 A1* | 3/2014 | McCauley | H04N 23/00 348/E5.022 |
| 2017/0109772 A1 | 4/2017 | Sundman et al. | |
| 2018/0082038 A1 | 3/2018 | Blair, II et al. | |

* cited by examiner

1500

| | | |
|---|---|---|
| Back | Confirm Action | Cancel |

Contact Info

| | |
|---|---|
| First Name | Bob |
| Last Name | Smith |
| Phone | 312-555-1234 |
| Email | bsmith@fsp.com |

Pick-up Order

Acme Pharmacy
123 Main St.
Chicago, IL 60606
Estimated Pickup Time: 1:38 PM

☑ I acknowledge that I have read, understand and agree to be bound by the Terms of Use and Online Privacy & Security Policy.

[ Submit ]

THANK YOU

- Reorder
- Brand X Shampoo
  5 oz

Tax: Calculated in store
Price: $1.57

Contact Info

| | |
|---|---|
| Name: | Bob Smith |
| Email: | bsmith@fsp.com |
| Phone: | 312-555-1234 |

Pick-up Location

123 Main St.
Chicago, IL 60606
Estimated Pickup Time: 6:18 PM

[ Done ]

*FIG. 16*

SYSTEM AND METHOD FOR AUTOMATICALLY REORDERING CONSUMER PRODUCTS

CROSS-REFERENCE TO RELATED APPLICATIONS

This application is a continuation of U.S. patent application Ser. No. 16/203,202 entitled "SYSTEM AND METHOD FOR AUTOMATICALLY REORDERING CONSUMER PRODUCTS" and filed on Nov. 28, 2018, the disclosure of which is incorporated herein by reference in its entirety.

FIELD OF DISCLOSURE

The present disclosure generally relates to a system and method for reordering a consumer product from a merchant, and more specifically relates to generating an identification tag, corresponding to a consumer product, that when scanned enables the consumer to reorder, return, and/or review the consumer product.

BACKGROUND

Individuals use a wide variety of consumer products in their day-to-day lives. Because many of these consumer products are finite, frequent replenishment of these consumer products is often required. However, replenishing a consumer product typically requires an individual physically traveling to a retail store to purchase the consumer product. In addition to spending time traveling to the store, a user then must spend more time locating the item in the store and then stand in a check-out line to purchase the item. In many instances, an individual must navigate the entire store to attain the strategically placed product, and is prone to becoming sidetracked. This process becomes even more time consuming and stressful when the store is busy and the individual must wait in a long line to purchase the item. Nevertheless, this process can prove to be entirely fruitless when the consumer product which the individual intended to purchase is out of stock or otherwise unavailable at the store. While in some instances purchasing an alternative product is an option, the individual typically must engage a store employee or have specialized knowledge and familiarity with the product in order to find a suitable alternative to the unavailable consumer product.

While online ordering provides a partial solution to this problem, it can also be tremendously time consuming and expensive. Existing online shopping technologies require an individual to navigate multiple web pages, search queries, ordering pages, and payment verification steps to place an order for a consumer product. While an individual may know exactly what item they want to purchase and have previously purchased the item from the retailer, the reordering process is often cumbersome because it requires the individual to create a specialized account and to log into that account for each purchase. Additionally, the consumer must wait to receive the item as opposed to the benefit of immediate possession that is provided by shopping at a brick and mortar store. While purchasing the product online may provide some benefits and conveniences, returning or exchanging products purchased online can be difficult, expensive, and time consuming. To return or exchange a product purchased online, an individual is required to ship the product back to the retailer, which entails the added time and financial expense of having to go a shipping merchant to send the product back. The individual seldom receives a refund or an exchanged product until after the retailer has received the returned/exchanged product.

While returning an item in person can offer some benefits, the process of returning a consumer product may be time consuming and frustrating. An individual may be forced to stand in a long line at retail store and/or have an uncomfortable conversation as to why the consumer wishes to return the consumer product. Further, as previously discussed, identifying a suitable alternative product can be difficult and requires specialized knowledge and familiarity that an average consumer or store employee likely does not possess.

Accordingly, a need exists for an improved experience for users to reorder, return, and/or review consumer products.

SUMMARY

The present application disclosure provides a system and method for capturing an image of identification tag corresponding to a consumer product to reorder, return, or review the consumer product.

In one embodiment, a method for reordering consumer products comprises: receiving, by one or more processors via a communications network and from a client device, an image of a physical depiction of an identification tag; determining, by the one or more processors, a consumer product that corresponds to the identification tag via at least one of: (i) optical character recognition, (ii) universal resource identifier decoding, (iii) object recognition, (iv) quick response code decoding, or (v) barcode decoding; determining, by the one or more processors, a retail location wherein the consumer product is not currently in stock and is expected to be in stock and available for pick-up at the retail location in the future; and automatically initiating, by the one or more processors, the reordering of the consumer product at the retail location.

In one embodiment, a system comprises a proprietary server connected to a host network, the proprietary server including: one or more databases storing a plurality of identification tags linked with a plurality of consumer products; a link via which the system is communicatively connected with a client device, the client device including an identification tag capture routine configured to capture an image of a physical depiction of the identification tag; and one or more processors configured to: receive, from the client device, an image of a physical depiction of an identification tag, determine a consumer product that corresponds to the identification tag via the databases and at least one of: (i) optical character recognition, (ii) universal resource identifier decoding, (iii) object recognition, (iv) quick response code decoding, or (v) barcode decoding, determine a retail location wherein the consumer product is not currently in stock and is expected to be in stock and available for pick-up at the retail location in the future, and automatically initiate the reordering of the consumer product at the retail location.

In one embodiment, one or more non-transitory computer-readable storage media have stored thereon a set of instructions, that when executed cause one or more processors to: receive, via a communications network and from a client device, an image of a physical depiction of an identification tag; determine a consumer product that corresponds to the identification tag via at least one of: (i) optical character recognition, (ii) universal resource identifier decoding, (iii) object recognition, (iv) quick response code decoding, or (v) barcode decoding; determine a retail location wherein the consumer product is not currently in stock and is expected to be in stock and available for pick-up at the retail location in the future; and automatically initiate the reordering of the consumer product at the retail location.

Accordingly, use of the identification tag systems, methods, and instructions, through the use of a specialized client application on one or more client devices, may enable a user to conveniently reorder, return, or review a consumer product.

BRIEF DESCRIPTION OF DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Accordingly, use of the identification tag system and methods, through the use of a specialized client application on one or more client devices, may enable a user to conveniently reorder, return, and/or review a consumer product. Further, wherever possible, the following description refers to the reference numerals included in the following figures, in which features depicted in multiple figures are designated with consistent reference numerals.

FIG. 15 illustrates an action confirmation screen of a client application;

FIG. 16 illustrates an action confirmation receipt screen of a client application;

DETAILED DESCRIPTION

Figure 1A:
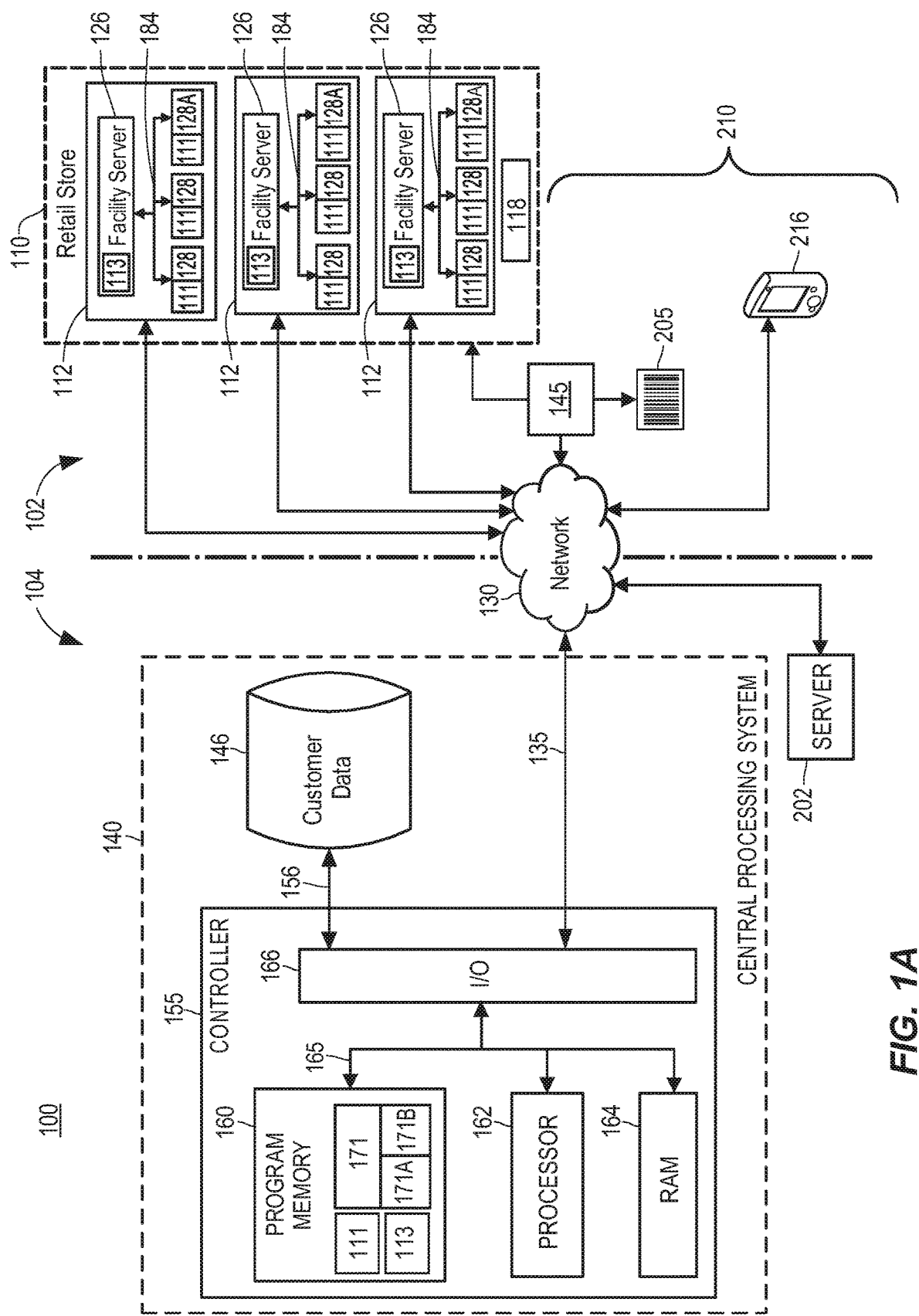
FIG. 1A illustrates various aspects of a system of components configured to facilitate the use of an identification tag for reordering, returning, or reviewing a consumer product.

The present disclosure generally relates to a system and method for reordering a consumer product, and more specifically relates to scanning an identification tag, corresponding to the consumer product, to initiate a convenient and efficient reorder, return, or review of the consumer product.

According to implementations, the systems and methods may support a dynamic, real-time or near-real-time communication, analysis, and processing of data. In particular, the systems and methods may generate an identification tag corresponding to a consumer product, scan the identification tag using a client device, analyze the identification tag to identify the consumer product associated with the identification tag, and enable a user to reorder, return, or review the consumer product using the client device.

It should be appreciated that in some embodiments, the systems and methods described herein enable a user to use a client device to reorder a consumer product by capturing an image of an identification tag corresponding to the consumer product and submitting a confirmation to reorder the consumer product, thereby reordering the consumer product with just one click. Whereas in other embodiments, merely capturing an image of the identification tag and transmitting the image to a proprietary server initiates a reorder of the consumer product.

As used herein, the term "identification tag" refers to any image, text, string of characters, graphical object, or other identifier that can be visually depicted. The identification tag may be a barcode, QR code, URL, or other textual/graphical coding scheme that represents/corresponds to a consumer product.

As used herein, the term "consumer product" (or "product" as it will often be referred to hereinafter) refers to any goods and/or services offered by a retailer or other business. Examples of consumer products include, but are not limited to, beauty products (e.g., cosmetics, hair care, skincare, makeup, fragrances, etc.), personal care products (e.g., soap, shampoo, toothpaste, tooth brushes, deodorant, mouthwash, sanitary napkins, shaving razors, shaving cream, dental floss, contact lenses, sexual health products, etc.), medical products (e.g., band aids, cough medicine, pain treatment, prescription drugs, allergy treatments, vitamins, dietary supplements, wellness supplements, etc.), household products (e.g., paper and plastic goods, laundry detergents, cleaning supplies, pet products, cutlery, school and office supplies, party supplies, candles, light bulbs, batteries, pest control, automotive parts, hardware, picture frames, travel products, etc.), clothing (e.g., shirts, pants, coats, hats, shoes, under garments, socks), furniture and storage products, appliances and electronics, food & drinks, toys, media content (e.g., photos, CDs, DVDs, video games, mobile device applications, books, magazines, digital audio files, digital image files, digital videos, virtual reality content, etc.), tickets (e.g., transportation tickets, sporting events, live performance shows, trade shows, concerts), subscription services (e.g., newspaper subscription, wine of the month, monthly charitable contribution), and/or any other consumable goods and services offered for sale by a retailer or other business.

As used herein, the term "reorder" refers to the act of initiating an order to refill, rebuy, repurchase, restock, replace, renew, reschedule, or otherwise replenish a good and/or service offered by a retailer or business. However, it should be appreciated that embodiments of the systems and methods described herein are intended to include/encompass the initial ordering, scheduling, and/or purchasing of a product or service. Accordingly, the term "reorder" is not meant to be limiting in that it only applies to subsequent purchases/orders of a product or service. The systems and methods described herein are intended to include, for example, an embodiment in which a user scans an existing identification tag in order to conveniently and quickly order a product for the first time, as opposed to other embodiments in which an identification tag is scanned to order the product for a second or greater time, thereby "reordering" the product.

In some embodiments, reordering the consumer product may correspond to renewing a subscription, service, license, and/or product. For example, the user may scan the identification tag to initiate renewal of a driver's license, passport, insurance policy, professional license, financial obligation (e.g., mortgage, car lease, etc.), transportation voucher (e.g., monthly train ticket,), organizational membership (e.g., professional society, athletic club, country club, etc.), or seasonal event tickets (e.g., sporting events, theatre, concerts, etc.). In some embodiments, the user may scan an identification to (re) schedule an appointment for a haircut, massage, doctor, dentist, therapy, physical training, accountant, lawyer, car wash, landscaping, painting, educational class, housing accommodation (e.g., hotel, apartment rental, short term dwelling sharing, etc.), travel accommodations (e.g., rental car, car lease, limousine ride, ride sharing, etc.), or other habitual product/service.

FIG. 1A illustrates various aspects of a system 100 of components configured to facilitate the use of an identification tag for reordering, returning, or reviewing a consumer product. It should be appreciated that the system 100 is merely an example and that alternative or additional components are envisioned. The system 100 includes both hardware and software applications, as well as various data communication channels for communicating data between the various hardware and software components. The system 100 may be roughly divided into front-end components 102 and back-end components 104. The front-end components 102 may include a host network 110 and a client network 210. The back-end components 104 may include a central processing system 140 and one or more proprietary servers 202.

The front-end components 102 communicate with the back-end components 104 via a network 130. The network 130 may be a proprietary network, a secure public Internet, a virtual private network or some other type of network, such as dedicated access lines, plain ordinary telephone lines, satellite links, combinations of these, etc. . . . In embodiments in which the network 130 comprises the Internet, data communication may take place over the network 130 via an Internet communication protocol.

The front-end components 102 may be disposed within a host network 110, including one or more retail stores 112, and/or or a client network 210, including any physical environment in which a user is physically present. In some embodiments, the host network 110 and the client network 210 may be a single network.

The client network 210 may include one or more client devices 216. The client device 216 may include, by way of example, any electronic device, such as a smart phone, a desktop computer, a laptop, a tablet, a phablet, a smart watch, smart glasses, wearable electronics, pager, personal digital assistant, a home assistant and/or digital concierge device, and/or any other electronic device, including computing devices configured for wireless radio frequency (RF) communication. The client device 216 may be communicatively connected to the one or more retail stores 112 and to a central processing system 140 through the network 130, as described below. Components and features of the client device 216 will be discussed in greater detail with respect to FIG. 1D.

The one or more retail stores 112 may be located, by way of example rather than limitation, in separate geographic locations from each other, including different areas of the same city, different cities, or even different states. Each of the retail stores 112 may be, for example, an in-store retail store, an on-line store, or a mail-order store. An in-store retail store may be a "brick and mortar" store that may include one or more physical buildings or structures, where each of the retail stores 112 may accommodate shoppers and customers. The host network 110 may also include one or more warehouses or order fulfillment facilities 118. The warehouses or order fulfillment facilities 118 may distribute consumer products and/or identification tags to the various retail stores 112 in the host network 110. The warehouse or order fulfillment facilities 118 may also receive a message to fulfill an order for a consumer product, and in some instances may also be responsible for shipping the consumer product to the customer. As used herein, the term "retail store" refers to any of these environments (e.g., kiosks, Internet interface terminals, etc.).

The one or more retail stores 112 may include a number of workstations 128 configured to execute various product and service-related applications. The workstations 128 may be local computers located in the various retail stores 112 throughout the host network 110. The workstations 128 may include a user interface application 111, a server application 113, a facility server 126, and/or a printer 145. Retail store personnel (not shown) may use the workstations 128 to access information relating to customers, store inventory, available products, payments, identification tags, and so forth. The server application 113 may be communicatively connected with the client device 216 via the network 130. The server application 113 may be configured to receive data/files, corresponding to a consumer product and/or an identification tag, transmitted from the client device 216, via the network 130, and then route the received data/files to other devices (e.g., the printer 145). For example, in some embodiments, the server application 113 may be configured to receive a message indicative of a purchase order for a consumer product, transmitted by the client device 216 using the client application 266, to be fulfilled and picked-up at the retail store 112.

The retail stores 112 may also include a plurality of facility servers 126 disposed instead of, or in addition to, a plurality of workstations 128. Each of the retail stores 112 may include one or more facility servers 126 that may facilitate communications between the workstations 128 of the retail stores 112 via the network 130, and may store information for a plurality of customers/employees/accounts/etc. associated with each facility. A local digital network 184 may also operatively connect each of the workstations 128 to the facility server 126. Unless otherwise indicated, any discussion of the workstations 128 also refers to the facility servers 126, and vice versa. Moreover, environments other than the retail stores 112, such as an order fulfillment facility 118, may employ the workstations 128 and the servers 126.

The printer 145 may be any device that is capable of printing, creating, or otherwise generating a physical depiction of an identification tag 205, based upon received data/files corresponding to the consumer product, a purchase order for a consumer product, and/or the identification tag. The server application 113, central processing system 140, the proprietary server 202, and/or client source device 216 may be communicatively connected with the printer 145. The printer 145 may be associated with a maximum resolution and/or a variety of supported print sizes. The printer 145 may print 2D or 3D depictions (e.g., images, text, a barcode, QR code, URL, an icon, a logo, etc.) on any tangible medium. In some embodiments, the printer 145 may be a 3D printer that prints the identification tag as one or more 3D articles (e.g., cutouts, sculptures, shapes, etc.) depicting the identification tag. The printer 145 may print the identification tag 205 on paper having adhesive qualities (e.g., "pull n' peel", sticker sheet, etc.) so that the identification tag may be easily and securely affixed to and/or removed from any number of surfaces and/or articles. Although FIG. 1A depicts only one printer 145, it should be appreciated that the server application 113, central processing system 140, the proprietary server 202, and/or client source device 216 may be interconnected to any number of printers configured to print a physical embodiment of the identification tag. Moreover, environments other than the retail stores 112 may employ a server application and a printer so that a user can print physical depictions of the identification tag from a personal, public, or other printer (e.g., within the client network 210) at the user's own convenience. Accordingly, in some embodiments the printer 145 may be part of the host network 110, whereas in other embodiments the printer 145 may be part of the client network 210. For example, a user may be able to print an identification tag from the user's own personal printer located in the user's home, office, or other personal dwelling. In another example, a warehouse, manufacturer, order fulfillment facility, or other related business may directly print the identification tags and place them on the consumer product or may print the identification tag directly onto the consumer product (e.g., as part of a label, logo, etc.).

The identification tag 205 may be a physical depiction of an identification tag corresponding to a consumer product. The identification tag 205 may be created, assigned, or otherwise generated by the central processing system 140 or proprietary server 202, and then printed by the printer 145. The identification tag 205 may be scanned by the client device 216, or a component of the client device 216, in furtherance of reordering, returning, reviewing, or taking another action with regard to the consumer product to which the identification tag corresponds. In some embodiments, the identification tag 205 may be a two-dimensional print (e.g., a piece of paper, a poster, a sticker, a pamphlet, a price tag, etc.). In some embodiments, the identification tag 205 may be a three-dimensional article (e.g., cutouts, sculptures, shapes, etc.). The identification tag 205 may have adhesive properties on one or more of its surfaces such that it is configured to be easily affixed and/or removed from any number of surfaces and/or articles. The identification tag 205 may be printed at the time of an initial purchase of a consumer product. In some embodiments, the identification tag 205 may be printed on, along with, or as part of a receipt for purchasing the consumer product at the retail store 112.

In some embodiments, the identification tag may be created/generated and printed by a user using the client application 266. A registry of identification tags and the one or more consumer products which they correspond to may be stored on the proprietary server 202, the central processing system 140, or a component thereof.

One or more of the front-end components 102 may be excluded from communication with the back-end components 104 by configuration or by limiting access due to security concerns. For example, the client device 216 may be excluded from direct access to the back-end components 104. In some embodiments, the retail stores 112 may communicate with the back-end components via the network 130. In other embodiments, the retail stores 112 and the client device 216 may communicate with the back-end components 104 via the same network 130, but digital access rights, IP masking, and other network configurations may deny access to the client device 216.

The back-end components 104 may include a central processing system 140 and one or more proprietary servers 202. The retail stores 112 may be communicatively connected to different back-end components 104 having one or more functions or capabilities that are similar to the central processing system 140. The central processing system 140 may include a database 146 and a controller 155. The controller 155 may be operatively connected to the database 146 via a link 156 connected to an input/output (I/O) circuit 166. It should be noted that, while not shown, additional databases may be linked to the controller 155 in a known manner. The central processing system 140 may implement a server application 113 for providing data to a user interface application 111 operating on the workstations 128. The central processing system 140 may include one or more computer processors 162 adapted and configured to execute various software applications and components of the system 100, in addition to other software applications. The database 146 is adapted to store data related to the operation of the system 100 (e.g., consumer products, related consumer products, alternative consumer products, identification tags, customer profile data, past purchases, inventory availability, a registry of identification tags and the consumer products which they represent, etc.) The central processing system 140 may access data stored in the database 146 when executing various functions and tasks associated with the operation of the system 100. Data stored in the database 146 may be delivered to the client device 216, the server application 113, facility server 126, workstation 128, etc. For example, the database 146 may store data (such as price, availability, available sizes, related products, alternative products, consumer reviews, retail store distribution, an identification tag, etc.) corresponding to a consumer product sold by the retailer.

It should be appreciated that the systems and methods described herein and/or any embodiments thereof may comprise different quantities and/or types of the components described. For example, although FIG. 1A depicts the system 100 as including one central processing system 140 in communication with three retail stores 112 and one client device 216, it should be understood that different numbers of processing systems, retail stores, and devices may be utilized. For example, the network 130 (or other digital networks, not shown) may interconnect the central processing system 140 to a plurality of included central processing systems 140, hundreds of retail stores 112, and thousands of client devices 216.

The controller 155 includes a program memory 160, the processor 162 (may be called a microcontroller or a microprocessor), a random-access memory (RAM) 164, and the input/output (I/O) circuit 166, all of which are interconnected via an address/data bus 165. A link 135 may operatively connect the controller 155 to the network 130 through the I/O circuit 166. Although FIG. 1A depicts only one controller 155 with one microprocessor 162, one program memory 160, and one RAM 164, it should be understood that different quantities of each may be utilized or present. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example.

The program memory 160 may contain machine-readable instructions (i.e., software) 171, for execution by the processor 162. The software 171 may perform the various tasks associated with operation of the retail store or retail stores, and may be a single module 171 or a plurality of modules 171A, 171B. While the software 171 is depicted in FIG. 1A as including two modules, 171A and 171B, the software 171 may include any number of modules accomplishing tasks related to retail store operation associated with the systems and methods described herein, including, for example, receiving consumer product orders, generating identification tags corresponding to a consumer product, managing inventory of one or more consumer products, filling orders for one or more purchased consumer products, managing a return of a consumer product, aggregating reviews of a consumer product, and/or other services relating to supporting/operating a retail store.

Figure 1B:
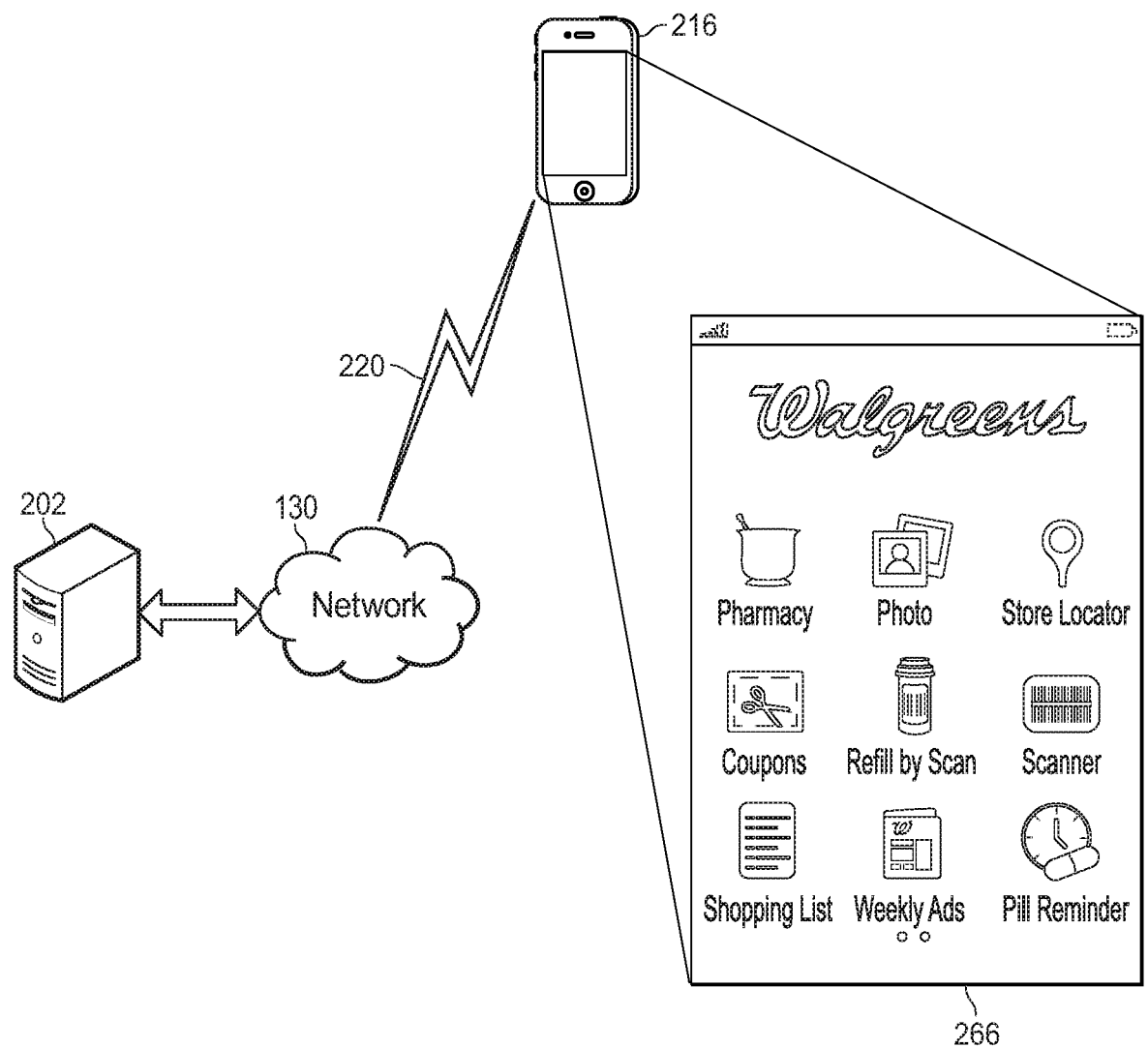
FIG. 1B illustrates an embodiment of the system in which a proprietary server and a client device are connected via a network.

FIG. 1B illustrates an embodiment of the system 100 in which a proprietary server 202 and the client device 216 are connected via the network 130. In some embodiments of implementing the system 100, the user may initiate and interact with the proprietary server 202 and the retail store systems (e.g., the central processing system 140) via a client device 216, a specialized application such as the client application 266, or a plurality of web pages. In some instances, the client device 216 may communicate with the network 130 via wireless signals 220 and, in some instances, may communicate with the network 130 via an intervening wireless or wired device (not shown), such as a wireless router, wireless repeater, base transceiver station of a mobile telephony provider, etc. . . . The client device 216 may interact with the proprietary server 202 to receive web pages or server data from the proprietary server 202, and may display the web pages or server data via a client application 266. For example, the client device 216 may display client application 266 and interact with the proprietary server 202 depending on the type of user-specified input. It should be appreciated that although only one proprietary server 202 is depicted in FIG. 1B, multiple proprietary servers 202 may be provided for the purpose of distributing server load, serving different web pages, implementing different portions of the retail store web interface, etc. . . . These multiple proprietary servers 202 may include a web server, an entity-specific server (e.g., an Apple® server, etc.), a server that is disposed in a retail or proprietary network, an independent third-party server that is not under the control of the entity, etc.

Figure 1C:
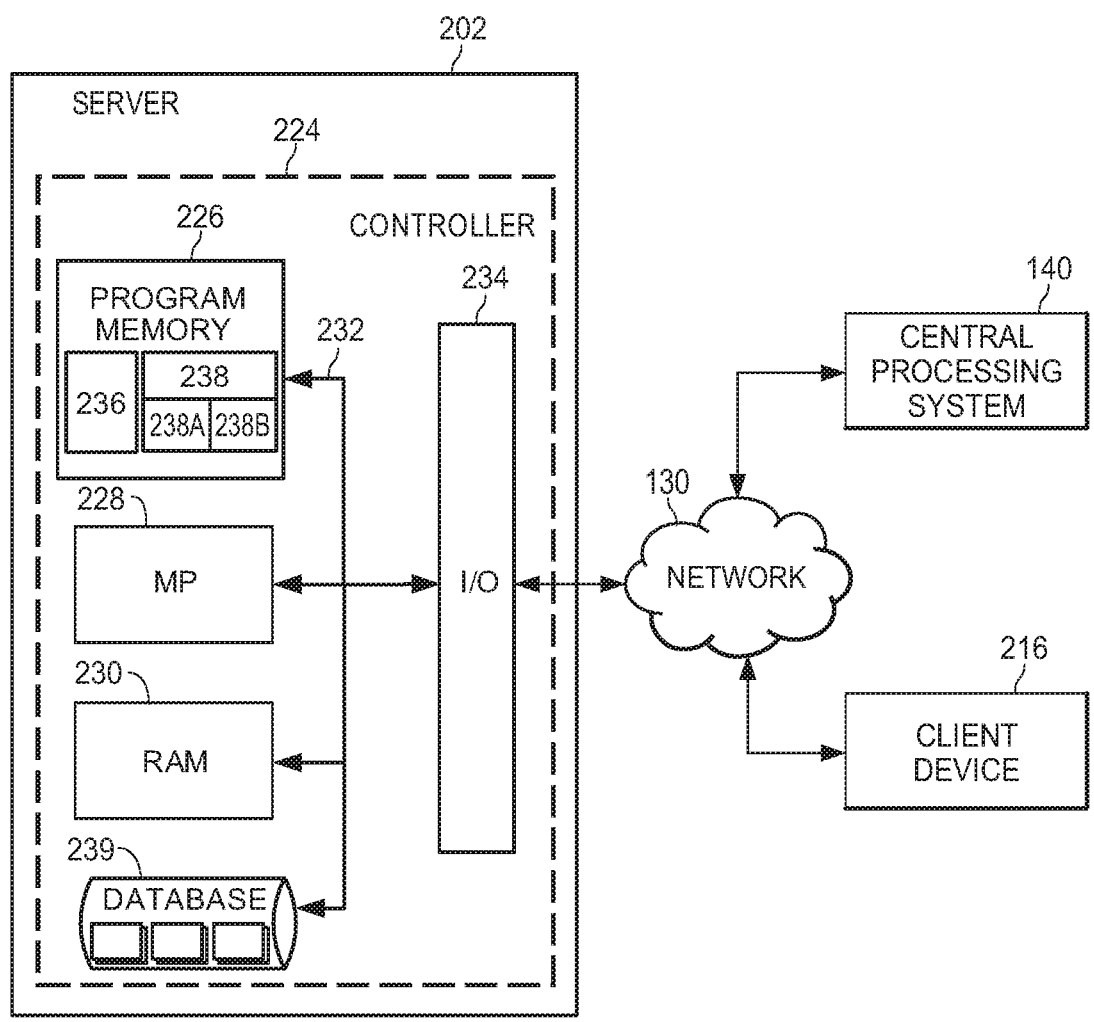
FIG. 1C illustrates an embodiment of the proprietary server.

FIG. 1C illustrates an embodiment of the proprietary server 202. The proprietary server may be connected to the central processing server 140, the facility server 126, and/or a client device 216 via the network 130. The proprietary server 202 includes a controller 224. The controller 224 includes a program memory 226, a microcontroller or a microprocessor (MP) 228, a random-access memory (RAM) 230, and an input/output (I/O) circuit 234, all of which are interconnected via an address/data bus 232. The controller 224 may implement the RAM(s) 230 and the program memories 226 as semiconductor memories, magnetically readable memories, and/or optically readable memories, for example. In some embodiments, the controller 224 may also include, or otherwise be communicatively connected to, a database 239 or other data storage mechanism (e.g., one or more hard disk drives, optical storage drives, solid state storage devices, etc.).

In some embodiments, the proprietary server 202 may act as a routing or interfacing server between the client device 216 and the central processing system 140 in order to assist in facilitating some of the functionality of the system 100. For example, the proprietary server 202 may be configured to communicate with the central processing system 140 and the client device 216 via a multitude of protocols, such as packet-switched protocols, web services, web APIs (Application Programming Interface), etc. . . . The proprietary server 202 may also convert (if necessary) and route client application data (not shown) to the appropriate server, such as the central process system 140. In some embodiments, the proprietary server 202 may act as the destination server and need not route any data from the client device 216. It should be appreciated that references made throughout this disclosure to transmitting/receiving data/files/etc. to and/or from the proprietary server 202 may also entail transmitting/receiving data/files/etc. to and/or from the central processing system 140, either directly or indirectly.

The program memory 226 and/or the RAM 230 may store various applications for execution by the microprocessor 228. For example, a user-interface application 236 may provide a user interface to the proprietary server 202, which may, for example, allow a network administrator to configure, troubleshoot, or test various aspects of the server's operation, or otherwise to access information thereon. A server application 238 operates to populate and transmit client application data and web pages to the client device 216, receive information from the client device 216 transmitted back to the proprietary server 202, and forward appropriate data to the central processing system 140 and the facility servers 126. The server application 238 may be a single module 238 or a plurality of modules 238A, 238B. While the server application 238 is depicted in FIG. 1C as including two modules, 238A and 238B, the server application 238 may include any number of modules accomplishing tasks related to implantation of the proprietary server 202. By way of example, the module 238A may populate and transmit the client application data and/or may receive and evaluate inputs from the user to receive a data access request, while the module 238B may communicate with one or more of the back end components 104 to fulfill a data access request. Although FIG. 1C depicts only one controller with one microprocessor 228, one program memory 228, and one RAM 230, it should be understood that different quantities of each may be utilized or present. Similarly FIG. 1C depicts the I/O circuit 234 as a single block, however, the I/O circuit 234 may include a number of different types of I/O circuits.

Figure 1D:
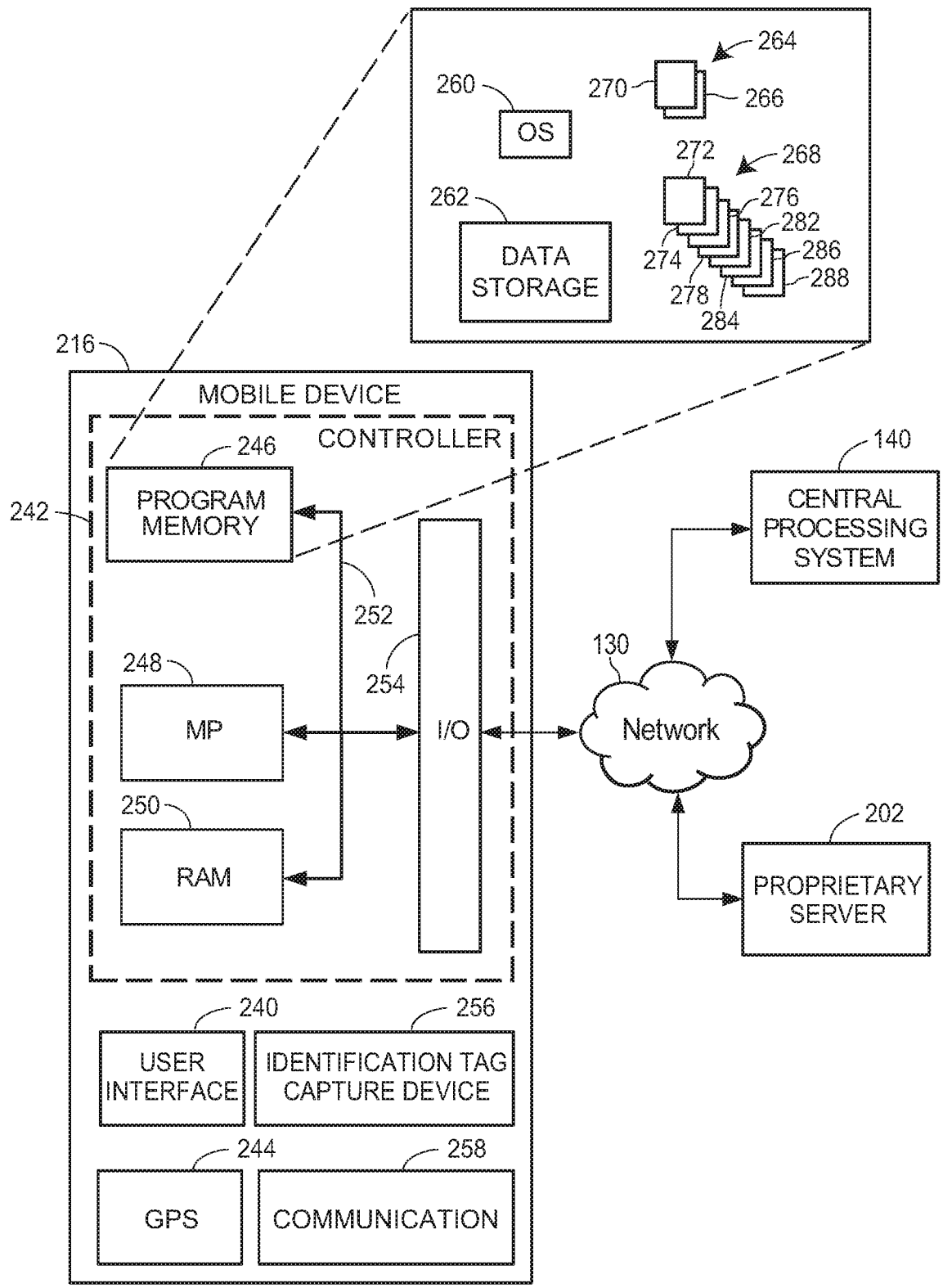
FIG. 1D illustrates an embodiment of the client device.

FIG. 1D illustrates an embodiment of the client device 216. The client device 216, or a plurality of client devices, may be configured to capture an image of an identification tag, order (or reorder/refill) a consumer product represented by the identification tag, return the consumer product, write a review of the consumer product, and/or purchase related and/or alternative products to the consumer product. The client device may be connected to the central processing server 140, proprietary server 202, and/or other components of the host network 110 via the network 130. The client device 216 may include a user interface 240, a controller 242, a Global Positioning System (GPS) unit 244, an identification tag capture device 256, and communication unit 258.

The user interface 240 (which may include the display) may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In some embodiments, the user interface 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 240 may include one or more user-input devices (not shown). In some embodiments, the user-input device may include a "soft" keyboard that is displayed on a display/screen of the client device 216, an external hardware keyboard communicating via a wired or a wireless connection (e.g., a Bluetooth keyboard), an external mouse, or any other suitable user-input device. In some embodiments, the user input device may be one or more auxiliary input ports such as a USB, lightning port, audio out, video out, etc. The user interface 240 may also include one or more user output devices (not shown) configured to connect the client device 216 to additional components and/or to facilitate delivery of content to other devices. For example, the user output device may be one or more auxiliary output ports such as a USB, lightning port, audio out, video out, etc. The user output device may be configured to connect to a speaker, projector, earphones, headset, television, computer, phone, virtual reality hardware, monitor, or other electronic device. It should be appreciated that in some embodiments, the user input device and user output device may be a single I/O component.

The controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as consumer product, a purchase order for a consumer product, the identification tag, user profiles, application data for the plurality of applications 264, routine data for the plurality of routines 268, and other data necessary to interact with the proprietary server 202, the central processing system 140, the facility servers 126, and/or the server applications 113 through the network 130. In some embodiments, the controller 242 may also include, or otherwise be communicatively connected to, other data storage mechanisms (e.g., one or more hard disk drives, optical storage drives, solid state storage devices, etc.) that reside within the client device 216. Although FIG. 1D depicts only one controller 242 with one microprocessor 248, one program memory 246, and one RAM 250, it should be understood that different quantities of each may be utilized or present. Similarly FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The GPS unit 244 may use "Assisted GPS" (A-GPS), satellite GPS, or any other suitable global positioning protocol or system that locates the position of the client device 216. For example, A-GPS utilizes terrestrial cell phone towers or Wi-Fi hotspots (e.g., wireless router points) to more accurately and more quickly determine location of the client device 216. The GPS unit 244 may also be configured to locate one or more retail stores 112 in furtherance of providing the user a retail store at which the user can pick-up or return a consumer product.

The communication unit 258 may communicate with the proprietary server 202 via any suitable wireless communication protocol network (e.g., GSM, CDMA, TDMA, WCDMA, LTE, EDGE, OFDM, GPRS, EV-DO, UWB, IEEE 802 including Ethernet, WiMAX, Wi-Fi, Bluetooth, and others). In some embodiments, the communication unit 258 is a transceiver.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the client device 216. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the proprietary server 202, the facility servers 126, or the server applications 113 while also receiving inputs from the user.

In some embodiments, the one or more of the plurality of software routines 268 may include an identification tag capture routine 272, an identification tag upload routine 274, an identification recognition routine 276, a consumer product inventory routine 278, an alternative product identification routine 282, a return consumer product routine 284, a consumer product review routine 286, and a location awareness routine 288.

One of the plurality of routines may include an identification tag capture routine 272 that coordinates with the identification tag capture device 256 to retrieve image data for use with one or more of the plurality of applications, such as the client application 266, or for use with other routines in furtherance of reordering the consumer product represented by the identification tag. The identification tag capture routine 272 may be implemented as a series of machine-readable instructions for operating/using the identification tag capture device 256 to capture, record, scan, or otherwise retrieve data corresponding to the identification tag.

The identification tag upload routine 274 may be implemented as a series of machine-readable instructions for uploading an image of the identification tag to the proprietary server 202 and/or determining whether the image of the identification tag is of sufficient image quality to identify certain visual indicators, corresponding to the identification tag, which may be depicted in the image. The identification tag upload routine 274 may employ one or more digital image analysis techniques, algorithms, routines, or the like to determine whether the image depicts a recognizable identification tag (i.e., an identification tag associated with the retailer), as well as assess and consider image characteristics such as sharpness, noise, range, tone reproduction, contrast, color accuracy, distortion, vignetting, exposure accuracy, lateral chromatic aberration (LCA), lens flare, color moire, and/or artifacts.

The identification tag recognition routine 276 may be implemented as a series of machine-readable instructions for determining the consumer product represented by the identification tag. The identification tag recognition routine 276 may analyze the captured image of the identification tag to identify a set of visual identifiers that may be depicted in the captured image, such as one or more graphical objects, logos, text, barcodes, labels, and/or the like that are the identification tag itself or correspond to the identification tag. The identification tag recognition routine 276 may employ any type of image analysis technique, including an object recognition technique(s), in analyzing the captured image of the identification tag. The identification tag recognition routine 276 may determine whether any identified visual identifiers match or are similar to the visual identifiers for an identification tag stored on the proprietary server. In some embodiments, the identification tag recognition routine 276 may comprise comparing the identified visual identifier(s) stored on the proprietary server or a database to the visual identifier(s) for the identification tag, wherein the proprietary server may calculate a similarity score based on the comparison, and deem that the visual identifier(s) is a "match" if the calculated similarity score meets or exceeds a threshold amount or value. For example, if the proprietary server calculates a similarity score of 85% and the threshold amount is 75%, then the proprietary server may deem that the visual identifier(s) in the captured image matches those associated with the identification tag. It should be appreciated that in comparing the visual identifier(s), the proprietary server may employ any type of algorithm, calculation, technique, or the like. In determining or identifying the details or information, the proprietary server may perform one or more optical character recognition (OCR) techniques. For example, when the identification tag is a barcode, the proprietary server may perform an OCR technique on the barcode that may be depicted in the captured image, wherein the output of the OCR technique corresponds to identifying the consumer product represented by the identification tag. For example, a consumer product may have a unique logo and position thereof, label shape/size, and color pattern for its identification tags. In another example, the identification tag may correspond to a uniform resource identifier (URI) to obtain the location of the registry of consumer products on the proprietary server, and the proprietary server may transmit a URI to a remote server (e.g., the proprietary server) and, in response, the remote server may transmit the consumer product associated with the URI.

The consumer product inventory routine 278 may be implemented as a series of machine-readable instructions for determining if the consumer product represented by the identification tag is available to be reordered. In some embodiments, the proprietary server 202 may execute the consumer product inventory routine 278 to determine whether any quantities of the consumer product are in-stock at a retail store 112, a warehouse, and/or other order fulfillment facility. The consumer product inventory routine 278 may be configured to analyze data, stored on/in a server, database, or other memory storage unit (such as the facility server 126 and the database 146) corresponding to current inventory, past inventory, future/expected inventory, shipping, and/or other data related to a retailer. The consumer product inventory routine 278 may be configured to determine the location of a retail store 112, proximate to the location of the client device 216, that has the consumer product in-stock and available for purchase. The consumer product inventory routine 278 may also be configured to determine the quantity of a consumer product in-stock at a retailer 112.

The alternative product identification routine 282 may be implemented as a series of machine-readable instructions for identifying an suitable alternative and/or related product to order in place of or in addition to reordering the consumer product represented by the identification tag. The alternative product identification routine 282 may be configured to determine one or more alternative consumer products to offer the user to order/purchase in place of or in addition to the consumer product represented by the scanned identification tag. The alternative product identification routine 282 may be configured to analyze the inventory of a retailer, a purchase history of a user, a return history of a user, past purchases of other users, consumer product reviews submitted by the user or other users, and/or other data that may enable the proprietary server 202 to determine one or more alternative products to offer the user to order/purchase as a replacement for and/or compliment to the consumer product. For example, based on a user's history of purchasing tooth paste and dental floss in the same transaction, the alternative product identification routine 282 may be configured to automatically generate an order for dental floss in response to detecting a request to reorder tooth paste. In some embodiments, the alternative consumer product may be a different size of the consumer product (e.g., a 5 oz. bottle of perfume instead of a 3 oz. bottle of perfume), a different brand/manufacturer of the consumer product (e.g., Duracell™ AAA batteries instead of Energizer™ AAA batteries), a complimentary product to the consumer product (e.g., hair conditioner to compliment shampoo, toothpaste to compliment a tooth brush, etc.), a product that was also purchased by other users who purchased the consumer product (e.g., a music album by Artist A was also purchased by users who purchased music album by Artist B), and/or other suggested products.

The return product routine 284 may be implemented as a series of machine-readable instructions for initiating a return of the consumer product represented by the identification tag.

The review product routine 286 may be implemented as a series of machine-readable instructions for initiating a review of the consumer product represented by the identification tag.

The location awareness routine 288 may be implemented as a series of machine-readable instructions for receiving, interpreting, and displaying location information of the client source device 216 from the GPS unit 244.

In some embodiments, the client device 216 may further include an identification tag capture device 256 configured to capture, record, collect, scan, etc. an image, or data corresponding to an image, of an identification tag. The identification tag capture device 256 may be any device configured to capture an image, scan, copy, video, and/or other type of visual depiction of the identification tag. In some embodiments, the identification tag capture device 256 is configured to capture multimedia, such as a recording with video and audio. The client capture device 256 may be built into, or a component of, the client device 216. In some embodiments, the identification tag capture device 256 may be an external camera, such as a webcam, that is communicatively coupled with the client device 216. Examples of the identification tag capture device include, but are not limited to, a camera, webcam, video recorder, fax machine, photocopy machine, digital scanner, barcode scanner, and QR code scanner. The client device 216 may store one or more image, video, and/or other files in a memory therein. For example, the client device 216 may include a database of files 239 within the memory. In some embodiments, the database 239 may be additionally or alternatively stored at a server (e.g., facility server 126, etc.) and/or another third party server (such as one associated with DropBox, Amazon, Google Drive, iCloud, etc.). In some embodiments the database 146 may store the same data as the database 239. Although FIG. 1D depicts the database 239 as coupled to the client device 216, it is envisioned that the database 239 may be maintained in the "cloud" such that any element of the system 100 capable of communicating over the network 120 may directly interact with the database 239.

As shown in FIG. 1B, to access the proprietary server 202, the facility servers 126, or the server applications 113, the user executes the client application 266 on the client device 216. Using the client application 266, the user may request server data (not shown) by navigating a series of client application screens, such as the home screen 222 of the client application 266. FIGS. 2-16 depict client application pages or screens that the proprietary server 202, the facility servers 126, or the server applications 113 may transmit in various embodiments of the system 100. In any event, the user may launch the client application 266 from the client device 216 via any suitable manner, such as touch-selecting a client application icon (not shown) on the user interface 240 of the client device 216, double-clicking on the client application icon via a mouse of a computer or a trackpad of a laptop, etc. . . . After the user launches the client application 266, the home screen 222 of the client application 266 is displayed to the user on the client device 216.

In an embodiment, the client device 216 may store machine-readable code, stored in a memory therein, representative of an identification tag application for capturing an image of an identification tag, ordering (or reordering/refilling) a consumer product represented by the identification tag, returning the consumer product, writing a review of the consumer product, and/or purchasing related and/or alternative products to the consumer product. As part of this, the user may launch and/or execute the client application 266. In response, the client device 216 may display one or more interfaces that may direct the user through the process of capturing an image of an identification tag, determining a consumer product corresponding to the identification tag, and initiating an action (e.g., reordering, returning, reviewing, etc.) relating to that consumer product. In some embodiments, the client device 216 may include a browser application that enables the user to navigate to a website to perform a task and/or functionality associated with the identification tag application. Accordingly, description herein of the functionality of an application, refers also to providing similar functionality via a web site, and vice versa.

Figure 2:
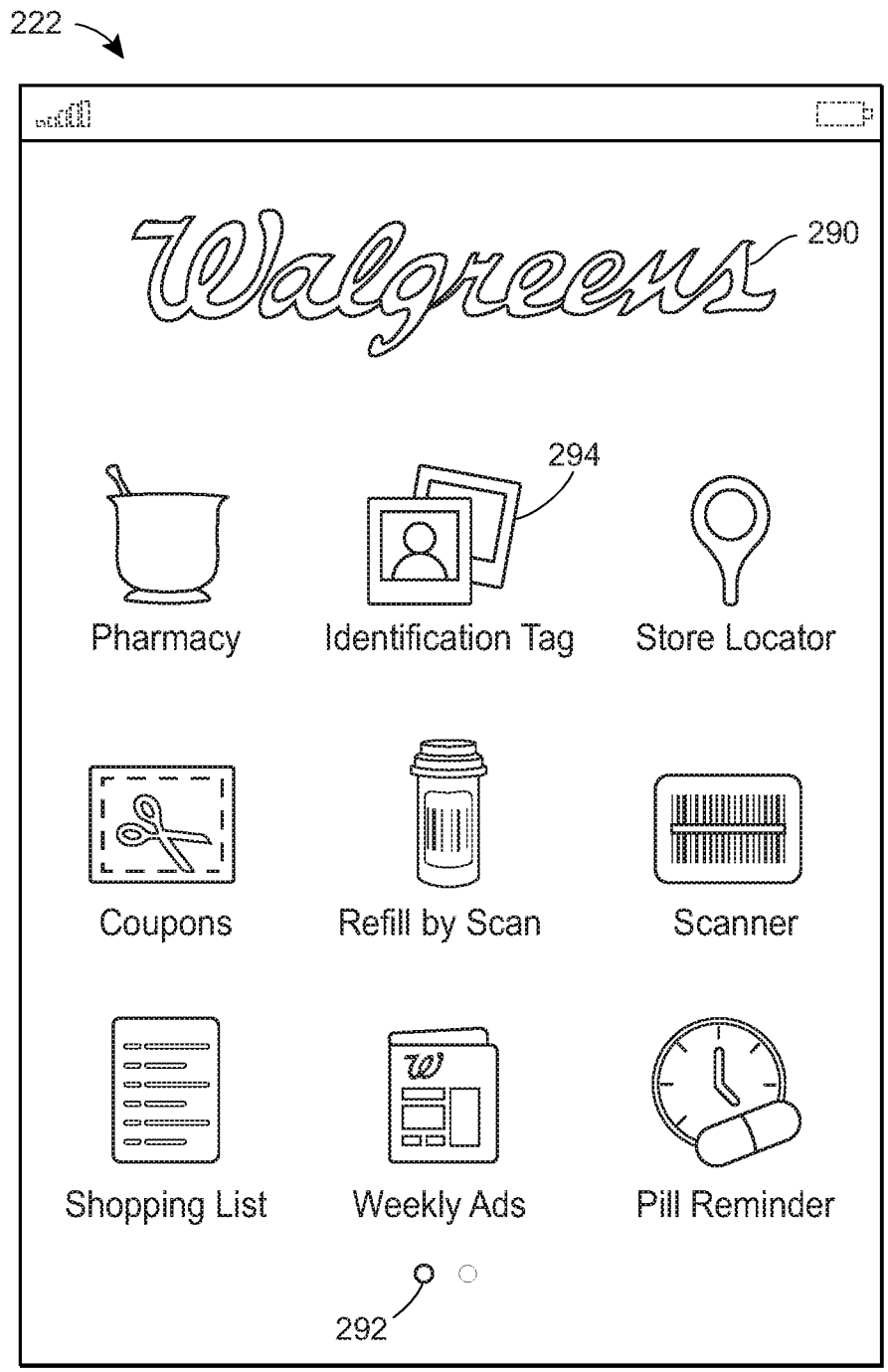
FIG. 2 illustrates a first menu page of a home screen of a client application displayed to a user on the client device.

FIG. 2 illustrates a first menu page of a home screen 222 of the client application 266 displayed to the user on the client device 216. The home screen 222 may include a company logo 282, an Identification Tag link 294, and a menu page indicator 292. In FIG. 2, the menu page indicator 292 denotes that only the first menu page of the home screen 222 is currently being displayed. The user may touch-swipe on the user interface 240 of the client device 216 to view the second menu page (not shown) of the home screen 222. The second menu page of the home screen 222 may display additional links that cannot be accommodated on the first menu page of the home screen 222 (e.g., a user log-in link, a shopping link, etc.). In another embodiment, using the client application 266, the user may request and navigate a series of web pages, such as webpage 221 for instance, transmitted, preferably in a secure manner (e.g., using Hypertext Transfer Protocol Secure, known as "HTTPS"), by the proprietary server 202 to the client device 216. These web pages 221 may be interpreted and displayed via a web browser 270 of the client device 216. It should be understood that it may be desirable for some or all of the data transmitted from the proprietary server 202 to the client device 216, or vice versa, to be encrypted and/or otherwise transmitted in a secure manner. In some embodiments, the client application 266 does not require the user to log onto the proprietary network 130 or the client application 266 to capture an image of the identification tag or to perform the other functionalities discussed herein. Whereas in some embodiments, the user may be required to log into the proprietary network 130 for the client application 266 to retrieve, from a remote server, data associated with the user, an identification tag, and/or a consumer product.

Figure 3:
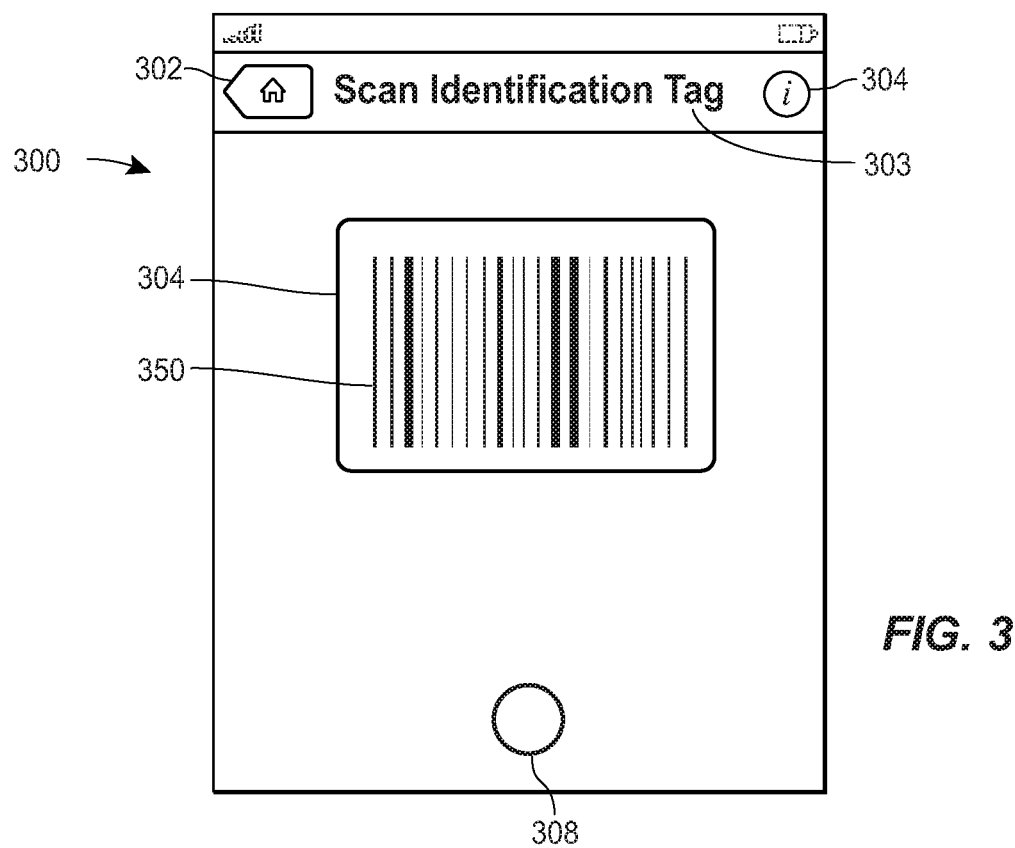
FIG. 3 illustrates an identification tag capture screen of a client application.
Figure 4:
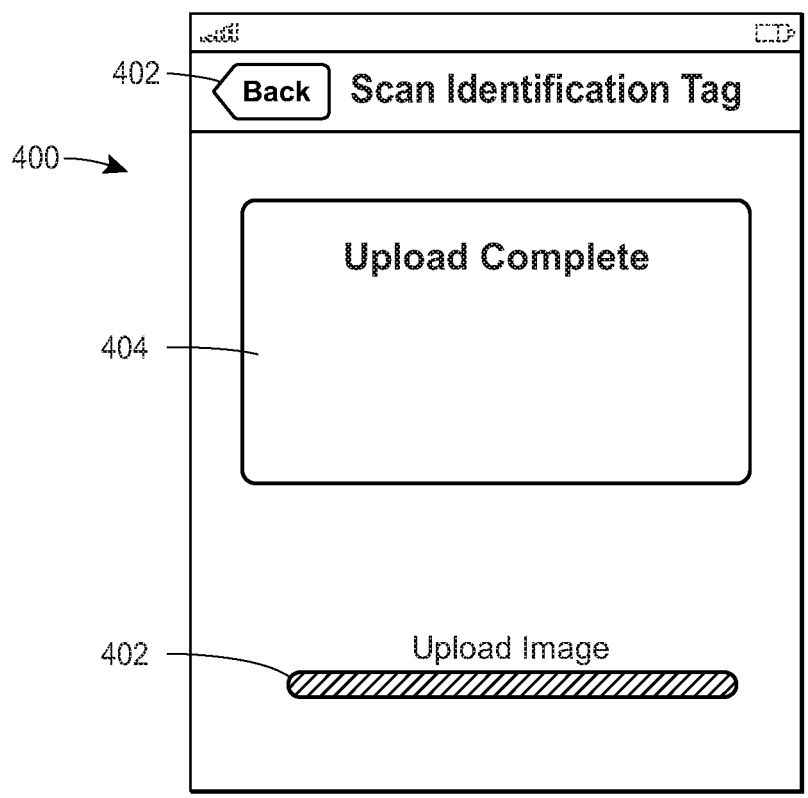
FIG. 4 illustrates an identification tag upload screen of a client application.

FIG. 3 illustrates an identification tag capture screen 300 of the client application 266. From the home screen 222, a user may select the "Identification Tag" link 294 to navigate directly to the identification tag capture screen 300 for capturing an image of an identification tag, as shown in FIG. 3, which may be displayed on the client device 216 via the client application 266. The identification tag capture screen 300 may include a home button 302 that causes the client application 266 to return to the home screen 222. An instructional message 303 may provide directions of use that assists the user in capturing an image of the identification tag. An information button 304 may cause the client application 266 to display instructions associated with the system 100, or cause the web browser 270 of the client device 216 to navigate to a web page containing such instructions. In some embodiments, the identification tag capture screen 300 may be a digital image capture application (e.g., the identification tag capture device 256 of the client device 216). In some embodiments, the identification tag capture screen 300 may include an image boundary 310 which serves to provide a template for a user to capture an image of the identification tag 350 within the image boundary 310 for the purpose of detecting the identification tag 350. The identification tag capture screen 300 may include an image capture button 308 that causes the client device to capture a digital image of the identification tag 350. For example, the image capture button 308 may cause the client application 266 to execute an identification tag capture routine 272 that coordinates with an identification tag capture device 256 to capture an image or video of the identification tag and provide the image data to the client application 266. The client application 266 may display the image data from the identification tag capture routine 272 on an identification tag image review screen (not shown). In response to receiving the command to display the identification tag image screen, the client application 266 may provide a selection to capture a new image or use the currently displayed image data on the identification tag image review screen. In response to receiving the command to capture a new image (e.g., because the previously captured image did not contain the identification tag or the image was too blurry), the client application 266 may again execute the identification tag capture routine 272 to capture another image of the identification tag. In any event, the selection to use the currently captured image (e.g., the quality or the subject matter of the currently captured image is acceptable to the user) may cause the client application 266 to navigate to an identification tag upload screen 400, as shown in FIG. 4, that may be displayed on the client device 216 via the client application 266. Further, selecting to use the captured image may cause the client application 266 to execute an identification tag upload routine 274. In some embodiments, capturing an image of the identification tag may automatically cause the client application 266 to execute the identification tag upload routine 274. In some embodiments, capturing an image of the identification tag may automatically cause the client application 266 to reorder the consumer product represented by the identification tag.

FIG. 4 illustrates an identification tag upload screen 400 of a client application 266. Before and/or while displaying the identification tag upload screen 400 to a user, the client application 266 may execute the identification tag upload routine 274 to upload/transmit the captured image of the identification tag to the proprietary server 202. While uploading or transmitting the captured image of the identification tag to the proprietary server 202, the identification tag upload screen 400 may display a status bar 410 that represents the progress of uploading the image of the identification tag to the proprietary server 202. If the user wishes to cancel the identification tag image transfer to the proprietary server 202, the "Back" selector icon 402 may be selected, and the client application 266 may interrupt the uploading process and display a "Cancel Upload" alert message. The "Cancel Upload" alert message (not shown) may request confirmation from the user to abort the upload of the image of the identification tag to the proprietary server 202. In any event, if the "Back" selector icon 402 is not selected, the identification tag upload screen 400 may continue to display image uploading progress via the status bar 410 until successfully transferred to proprietary server 202. During this process and/or after the image has been uploaded to the proprietary server 202, the client application 266 may execute the identification tag recognition routine 276 to recognize a consumer product represented by the identification tag. In response to receiving a confirmation that the image of the identification tag successfully uploaded to the proprietary server 202, the client application 266 may display an "Upload Complete" alert message 404. In an embodiments in which the image of identification tag could not be recognized and has not successfully uploaded to the proprietary server 202, the client application 266 may display an "Unsuccessful Upload" alert message (not shown), indicating to the user that the image/video of the identification tag was not uploaded to the proprietary server 202. In some embodiments, the client application may display an alert to the user indicating why the image/video of the identification tag was not uploaded (e.g., "Unknown Identification Tag," "No Product Found," "Image Too Quality Low," "Insufficient Image Resolution," etc.), and may provide instructions to the user on how to correct the image (e.g., "Please Recapture Image With Brighter Light", "Please Center Identification Tag," etc.). After the client application has displayed an alert message to the user that the image/video of the identification tag was not uploaded, the client application 266 may navigate back to the identification tag capture screen 300 in order to recapture an image of the identification tag. After the proprietary server 202 successfully identifies a consumer product represented by the identification tag, as a result of executing the identification tag recognition routine 276, the client application 266 may navigate to a product action source screen 500, as shown in FIG. 5.

Figure 5:
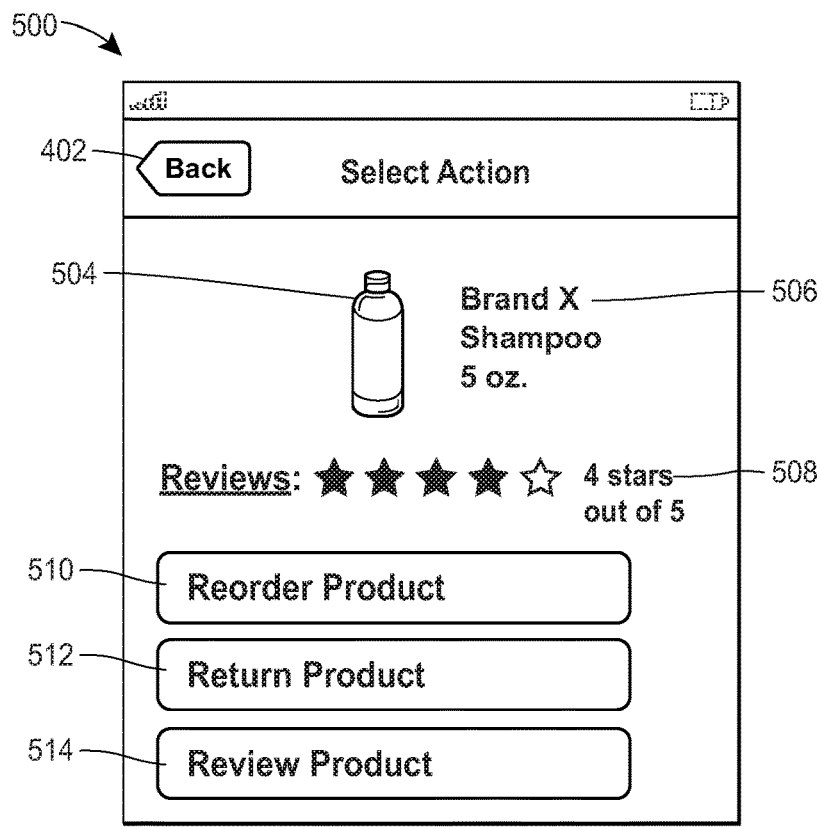
FIG. 5 illustrates a product action source screen of a client application.
Figure 6:
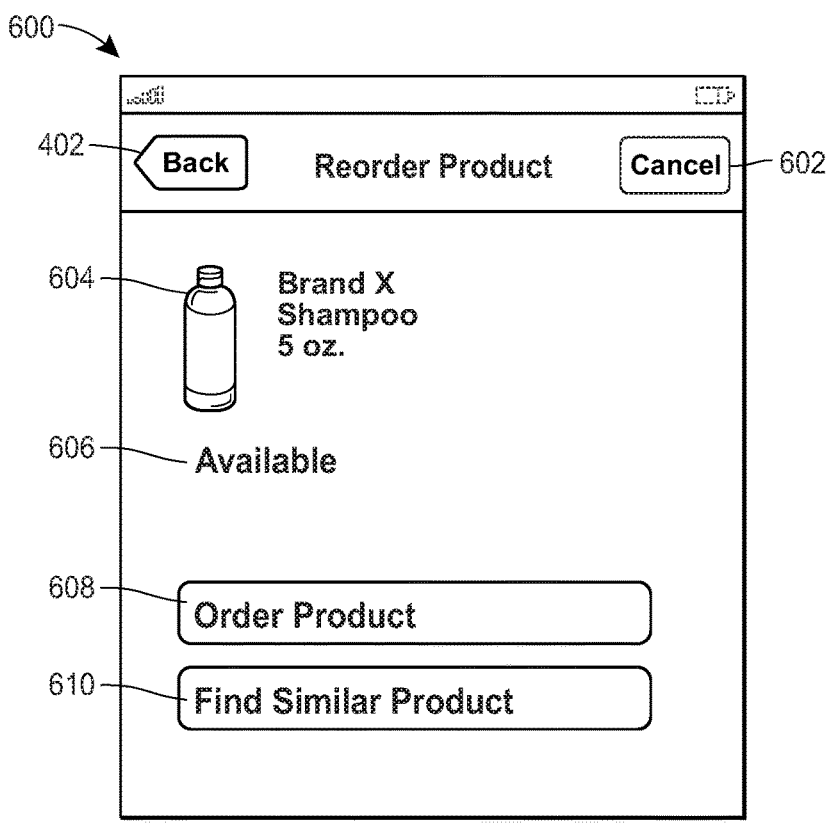
FIG. 6 illustrates a product order selection screen of a client application.
Figure 7:
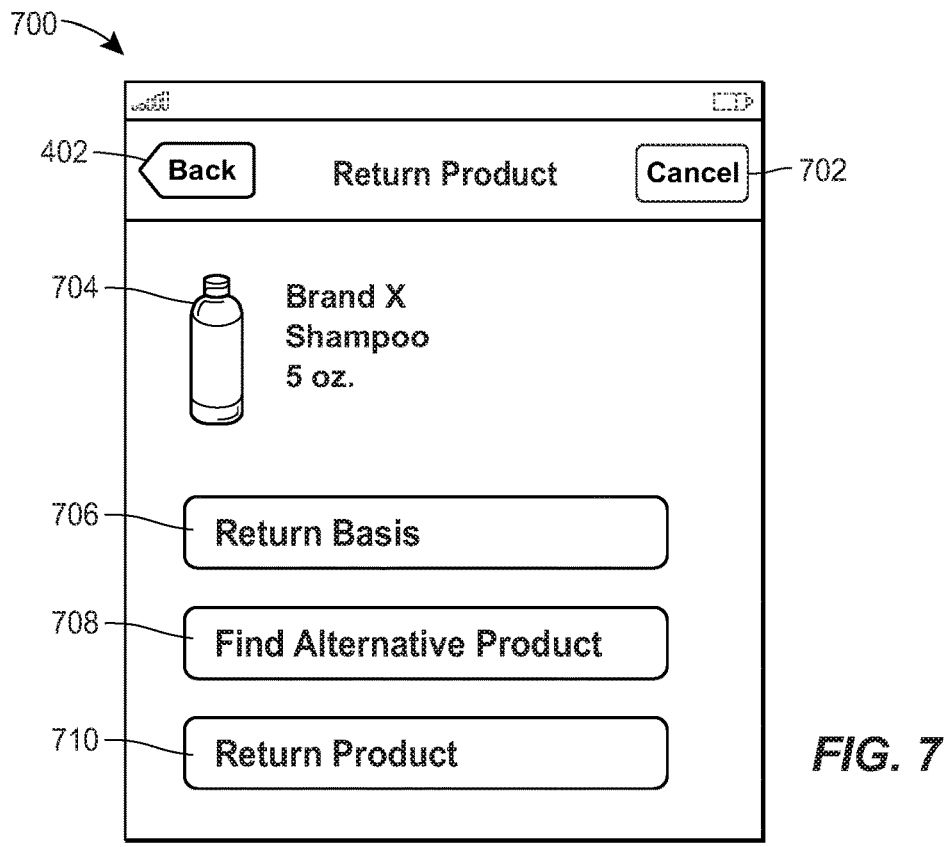
FIG. 7 illustrates a return product screen of a client application.

FIG. 5 illustrates a product action source screen 500 of a client application 266. The product action source screen 500 may provide a user interface 240 on the client application 266 for selecting between ordering, returning, or reviewing the consumer product associated with the scanned identification tag. The product action source screen 500 may include a "Back" selector icon 402 that causes the client application 266 to return to the identification tag capture screen 300 and/or the home screen 222. The product action source screen 500 may include an image of the consumer product 504, information about the consumer product 506, posted reviews of the consumer product 508, an order product selector icon 510, a return product selector icon 512, a review product selector icon 514, or any other selector icons or buttons suitable for the user to take an action related to the consumer product. Activating the order product selector icon 510 may cause the client application 266 to navigate to a product order selection screen 600, as shown in FIG. 6, in furtherance of initiating an order for the consumer product corresponding to the identification tag. Activating the return product selector icon 512 may cause the client application 266 to navigate to a return product screen 700, as shown in FIG. 7, and execute the return consumer product routine 284 to initiate a return of the consumer product corresponding to the identification tag. Activating the review product selector icon 514 may cause the client application 266 to navigate to a review product screen 800, as shown in FIG. 8, and execute a consumer product review routine 286 for the user to review/provide feedback on the consumer product corresponding to the identification tag.

FIG. 6 illustrates a product order selection screen 600 of a client application 266. The product order selection screen 600 is configured to enable a user to order the consumer product represented by the identification tag. The product order selection screen 600 may include a "Back" selector icon 402 that causes the client application 266 to return to the product action source screen 500, an identification tag capture screen 300, and/or the home screen 222. Similarly, if the user selects a "Cancel" selector icon 602, the client application 266 may display a "Cancel" message alert (not shown) to confirm that the user wishes to cancel ordering the consumer product. The product order selection screen 600 may include an image and/or text 604 identifying the consumer product, an inventory status image 606, an order product selector icon 608, a find similar products selector icon 610, and/or any other suitable selector icons or buttons suitable for the user to take an action related to ordering the consumer product. When the order product selector icon 512 is activated on the product action source screen 500, prior to or while launching the product order selection screen 600, the proprietary server may execute the consumer product inventory routine 278 to determine whether the consumer product can be reordered. The inventory status image 606 may display, or otherwise be indicative of, the results of the consumer product inventory routine 278. For example, when the consumer product inventory routine 278 determines the product is available to be reordered, the inventory status image 606 may be an image/text displaying a message such as "Available", "In Stock and Available for Pick-Up", "Limited Quantities Remaining", etc. . . . Whereas, when the consumer product inventory routine 278 determines the product is not available to be reordered, the inventory status image 606 may, for example, be an image/text displaying a message such as "Not Available", "Sold Out", "Product No Longer Sold By Retailer", "Discontinued", etc. . . . When the consumer product inventory routine 278 determines the product is not available to be reordered, the order product selector icon 608 may not be displayed on the product order selection screen 600, may not be configured to be activated by a user, or may display an error message when activated by a user. In some embodiments, activating the order product selector icon 608 may cause the client application 266 to navigate to a product order information screen 1000, as shown in FIG. 10, in furtherance of ordering the consumer product. In some embodiments, such as those described with "one click" ordering, activating the order product selector icon 608 may cause the client application 266 to navigate to an action confirmation screen 1500, as shown in FIG. 15, to confirm a request to reorder the consumer product. Activating the find similar products selector icon 608 may cause the client application 266 to navigate to an alternative product source screen 900, as shown in FIG. 9, and execute an alternative product identification routine 282 in furtherance of ordering an alternative consumer product.

Figure 12:
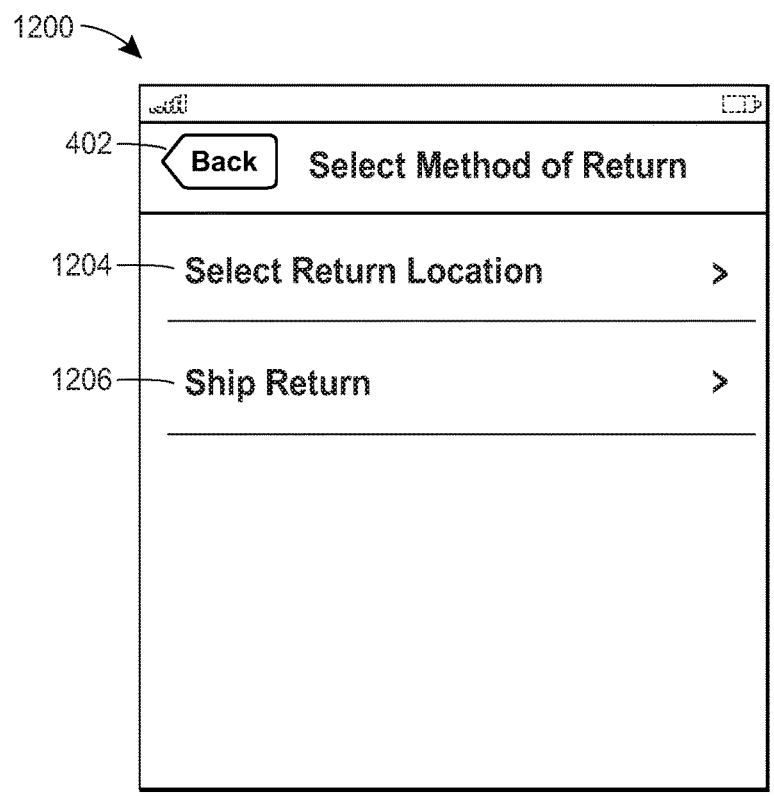
FIG. 12 illustrates a return method selection screen of a client application.

FIG. 7 illustrates a return product screen 700 of a client application 266. The return product screen 700 may include the "Back" selector icon 402 that may cause the client application 266 to return to the product action source screen 500, an identification tag capture screen 300, and/or the home screen 222. Similarly, if the user selects a "Cancel" selector icon 702, the client application 266 may display a "Cancel" message alert (not shown) to confirm that the user wishes to cancel returning the consumer product. The return product screen 700 may include an image and/or text 704 identifying the consumer product, a return basis selector icon 706, an alternative product selector icon 708, and a submit return selector icon 710. In response to receiving a selection of the return basis selector icon 706, the client application 266 may navigate the user to an additional display screen (not shown) in which the user may manually enter, select from a list, or select from a drop down menu a reason or basis for returning the consumer product (e.g., "Too Big", "Too Small", "Too Expensive", "Broken", "Did Not Like", etc.). Activating the alternative product selector icon 708 may cause the client application 266 to navigate to an alternative product source screen 900, as shown in FIG. 9, in furtherance of ordering an alternative consumer product to replace the returned consumer product. In any event, the user may select the "Submit Return" selector icon 710 to cause the client application 266 to navigate to a return method selection screen 1200, as shown in FIG. 12, in furtherance of returning the consumer product. In some embodiments, activating the "Submit Return" selector icon 710 may cause the client application 266 to navigate to an action confirmation screen 1500, as shown in FIG. 15, to confirm a request to return the alternative product.

Figure 8:
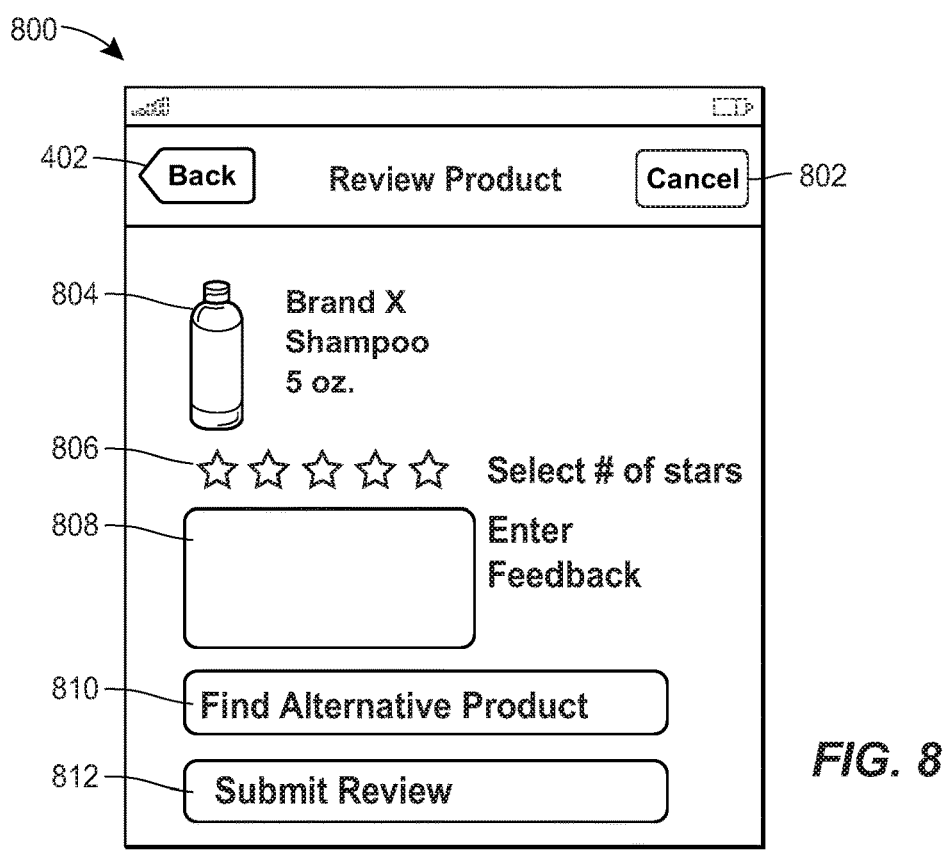
FIG. 8 illustrates a review product screen of a client application.

FIG. 8 illustrates a review product screen 800 of a client application 266. The review product screen 800 may include the "Back" selector icon 402 that may cause the client application 266 to return to the product action source screen 500, an identification tag capture screen 300, and/or the home screen 222. Similarly, if the user selects a "Cancel" selector icon 802, the client application 266 may display a "Cancel" message alert (not shown) to confirm that the user wishes to cancel reviewing the consumer product. The review product screen 800 may include an image and/or text 804 identifying the consumer product, one or more review related selector icons 806 (e.g., a star, grade, numeric, or other review scale), a user comments entry field 808, an alternative product selector icon 810, and a submit review selector icon 812. In some embodiments, the consumer product may be reviewed by selecting the one or more review related selector icons 808. In some embodiments, selecting the one or more review related selectors icons 808 may cause the client application 266 to navigate the user to an additional display screen (not shown) in which the user may manually enter, select from a list, or select from a drop down menu a score, grade, comments, and/or other feedback related to reviewing the consumer product. In some embodiments, the user may manually enter a review/feedback of the consumer product by entering his/her own comments/feedback into the user comments entry field 808. Activating the alternative product selector icon 810 may cause the client application 266 to navigate to an alternative product source screen 900, as shown in FIG. 9, and execute an alternative product identification routine 282 in furtherance of ordering an alternative consumer product. In any event, the user may select the "Submit Review" selector icon 812 to submit the review to the proprietary server and cause the client application 266 to navigate to an action confirmation screen 1500, as shown in FIG. 15.

Figure 9:
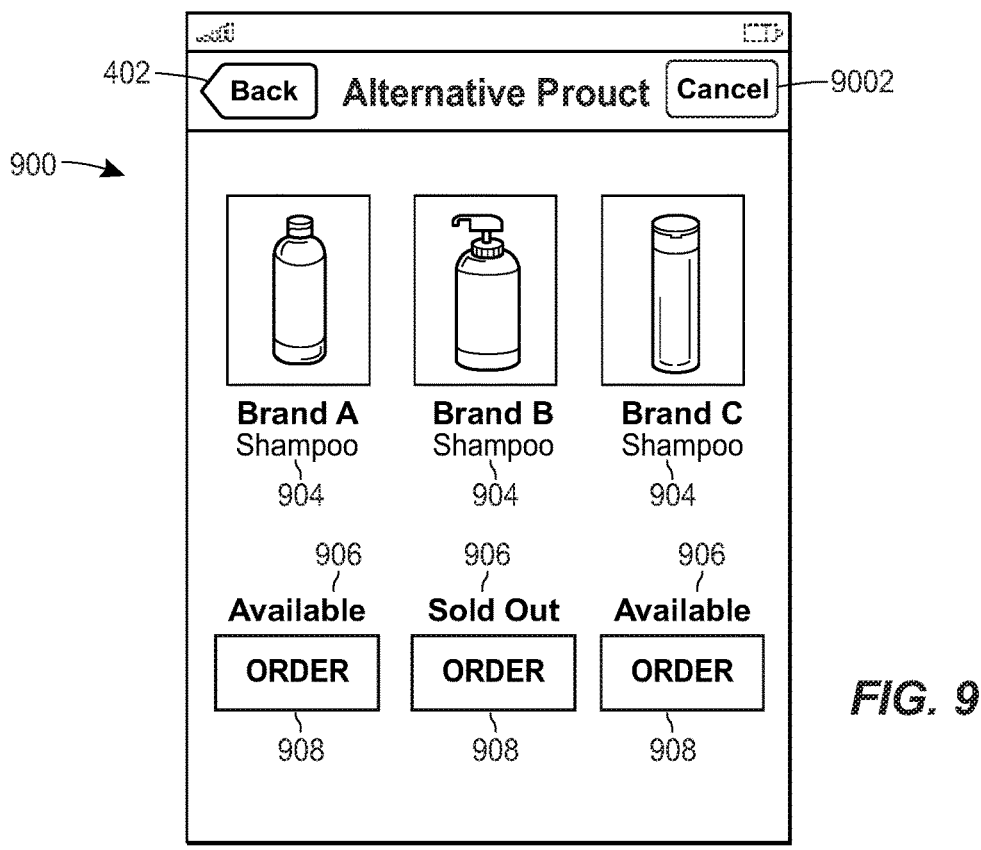
FIG. 9 illustrates an alternative product source screen of a client application.
Figure 10:
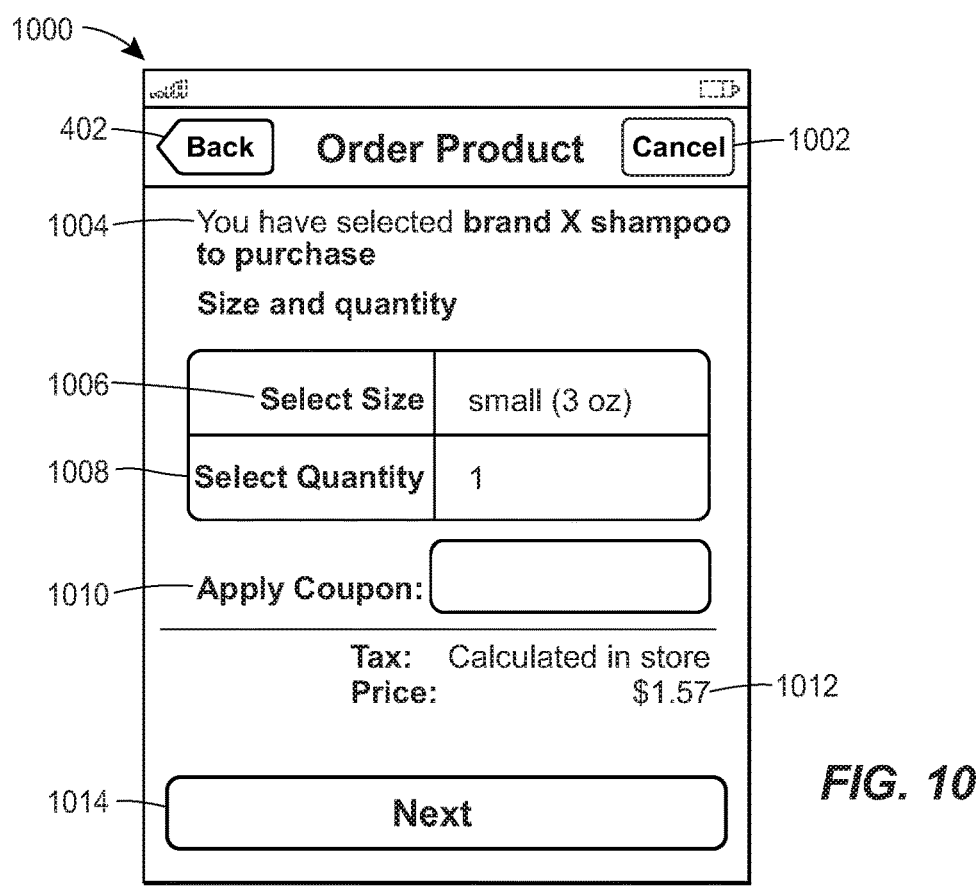
FIG. 10 illustrates a product order information screen of a client application.

FIG. 9 illustrates an alternative product source screen 900 of a client application 266. The alternative product source screen 900 is configured to suggest an alternative product, to the consumer product represented by the identification tag, for the user to order. The alternative product source screen 900 may include a "Back" selector icon 402 that causes the client application 266 to return to the product action source screen 500, an identification tag capture screen 300, and/or the home screen 222. Similarly, if the user selects a "Cancel" selector icon 902, the client application 266 may display a "Cancel" message alert (not shown) to confirm that the user wishes to cancel ordering the alternative product. The alternative product source screen 900 may include one or more images and/or text 904 of one or more alternative products, one or more inventory status images 906, one or more order product selector icons 908, and/or any other suitable selector icons or buttons suitable for the user to select an alternative product to order. Prior to or while launching the alternative product source screen 900, the proprietary server may execute the alternative product identification routine 282 to identify the one or more alternative products. The alternative product source screen 900 may display, or otherwise be indicative of, the results of the alternative product identification routine 282. Activating one of the order product selector icons 908 may cause the client application 266 to navigate to a product order information screen 1000, as shown in FIG. 10, in furtherance of ordering the selected alternative product. In some embodiments, such as those described with "one click" ordering, activating one of the order product selector icons 908 may cause the client application 266 to navigate to an action confirmation screen 1500, as shown in FIG. 15, to confirm a request to order the alternative product.

Figure 11:
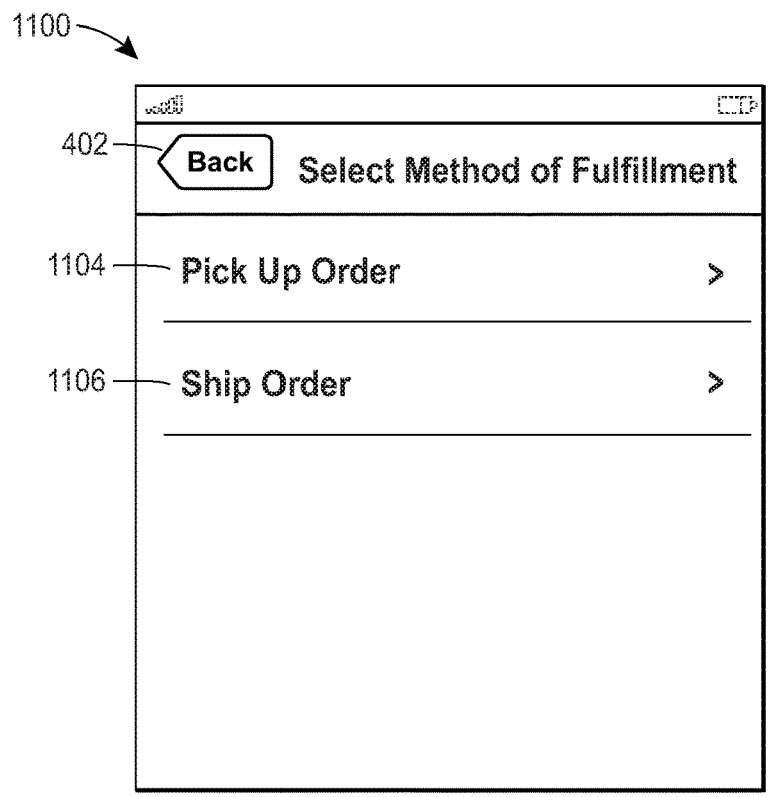
FIG. 11 illustrates an order fulfillment screen of a client application.

FIG. 10 illustrates a product order information screen 1000 of a client application 266. The product order information screen 1000 may include the "Back" selector icon 402 that may cause the client application 266 to return to the product order selection screen 600, the alternative product source screen 900, the product action source screen 500, the identification tag capture screen 300, and/or the home screen 222. In response to receiving a selection of the "Back" selector icon 402, the client application 266 may display a "Remove Product" alert message (not shown) that notifies the user that the selected product will be removed from the order if the user wishes to select a new/different product to order. Similarly, if the user selects a "Cancel" selector icon 1002, the client application 266 may display a "Cancel" message alert (not shown) to confirm that the user wishes to cancel the order. The product order information screen 1000 may include an image and/or text 1004 corresponding to the product (i.e., the consumer product and/or the alternative product) selected to be ordered. Additionally, the product order information screen 1000 may include a product size selector icon 1006 and/or a product quantity selector icon 1008. In response to receiving a selection of the product size selector icon 1006, the client application 266 may display the availability of one or more size selections for the product. For example, upon selecting the product size selector icon 1006, the client application 266 may display a selection to order the product in a Small (3 oz.), Medium (5 oz.), or Large (10 oz.). Additionally, the client application 266 may display to the user the corresponding price for each different sized product. Upon receiving a selection for the product quantity selector icon 1008, the client application 266 may display one or more quantities of the product of which the user may select to order. Based on the received size and quantity inputs of the user, the client application 266 may calculate the total price 1012 or quote (optionally including sales tax) of the order. Moreover, in calculating the total price, the client application 266 may also include an applied coupon that the user may enter via the "Apply Coupon" field 1010. In any event, the user may select the "Next" selector icon 1014 to navigate to an order fulfillment screen 1100, as shown in FIG. 11, that may be displayed on the client device 216 via the client application 266. It should be appreciated that in some embodiments, the content and selections provided as part of the product order information screen 1000 may be displayed/selected as part of the product order selection screen 600 and/or the alternative product source screen 900. For example, in some embodiments, the user may select the size and quantity of the consumer product on the product order selection screen 600. Further, in some embodiments, such as those described with "one click" ordering, the product order information screen 1000 may not be displayed to a user because the information is automatically selected based on the scanned identification tag, previously provided user preferences comprising a user profile, past orders, and/or product availability.

Figure 13:
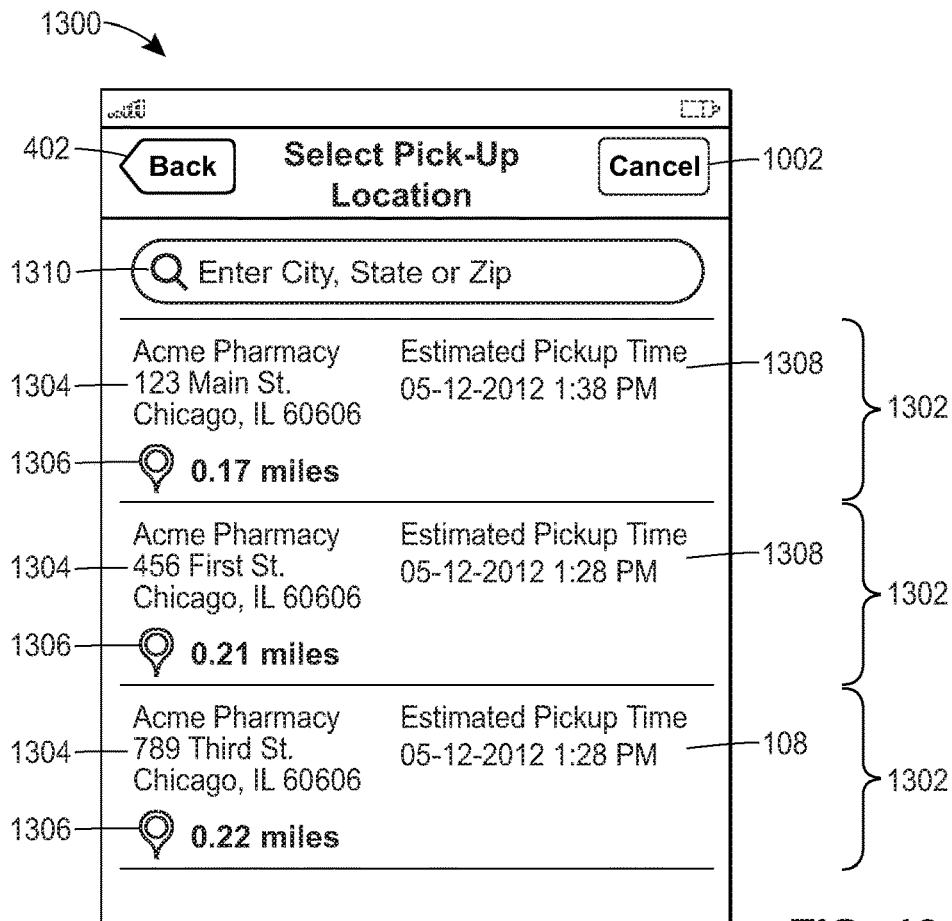
FIG. 13 illustrates a pick-up location selection screen of a client application.

FIG. 11 illustrates an order fulfillment screen 1100 of a client application 266. The order fulfillment selection screen 1100 may include the "Back" selector icon 402 that may cause the client application 266 to display the product order information screen 1000 for the user to select a different size and/or a different quantity of the selected product, the alternative product source screen 900, the product action source screen 500, the identification tag capture screen 300, and/or the home screen 222. The order fulfillment screen 1100 may include a pick-up order selector icon 1104 and a ship order selector icon 1106 for the user to select a method to fulfill the order. Activating the pick-up order selector icon 1104 may cause the client application to navigate to a pick-up location selection screen 1300, as shown in FIG. 13, in furtherance of selecting a location from which to pick-up the order. Activating the ship order selector icon 1104 may cause the client application to navigate to a shipping information screen 1400, as shown in FIG. 14, in furtherance of selecting/entering a shipping address for the order.

FIG. 12 illustrates a return method selection screen 1200 of a client application 266. The return method selection screen 1200 may include the "Back" selector icon 402 that when activated may cause the client application 266 to navigate back to the return product screen 700, the product action source screen 500, the identification tag capture screen 300, and/or the home screen 222. The return method selection screen 1200 may include a return location selector icon 1204 and a ship return selector icon 1206 for the user to select a method of returning the consumer product. Activating the return location selector icon 1204 may cause the client application to navigate to a pick-up location selection screen 1300, as shown in FIG. 13, in furtherance of selecting a location at which the consumer product may be returned and/or dropped off. Activating the ship return selector icon 1204 may cause the client application to navigate to a shipping label screen (not shown) that generates a shipping label for returning the consumer product to the retailer, that may be printed by the user. After the shipping label has been printed, the client application 266 may navigate the user to a confirmation receipt screen 1600, as shown in FIG. 16.

FIG. 13 illustrates a pick-up location selection screen 1300 of a client application 266. The pick-up location selection screen 1300 may include the "Back" selector icon 402 that may cause the client application 266 to navigate back to the order fulfillment screen 1100, the return method selection screen 1200, the product order information screen 1000 selected product, the alternative product source screen 900, the product action source screen 500, the identification tag capture screen 300, and/or the home screen 222. The pick-up location selection screen 1300 may also include one or more location selector icons 1302 that allow the user to select from a plurality of locations, such as a particular retail store or a centralized order fulfillment location/kiosk (associated with a corresponding retail store selector icon 1302) from which the order may be picked up or to which the consumer product may be returned. Each location selector icon 1302 may include an address of the location 1304, a distance 1306 to the location from the current location of the client device 216, and an estimated pick-up time 1308 at which the order will be available for pick-up or the consumer product may be returned. The client application 266 may additionally select the location for the user by using a pre-determined default retail store, automatically selecting the most proximal retail store, or using any other manner suitable to determine a retail store for picking up an order or returning the consumer product. Alternatively, the user may enter a city and state or a zip code into an address field 1310 to view locations not residing in the immediate geographical area surrounding the current location of the client device 216. For example, in response to receiving a zip code, the client application 266 displays a list of locations within the received zip code. In any event, when the user selects a particular location selector icon 1302, the client application may navigate the user to an action confirmation screen 1500, as shown in FIG. 15, that may be displayed on the client device 216. Further, in some embodiments, such as those described with "one click" ordering, the pick-up location selection screen 1300 may not be displayed to a user because the information is automatically selected based on the scanned identification tag, a user profile, previously provided user preferences comprising a user profile, past orders, and/or product availability.

Figure 14:
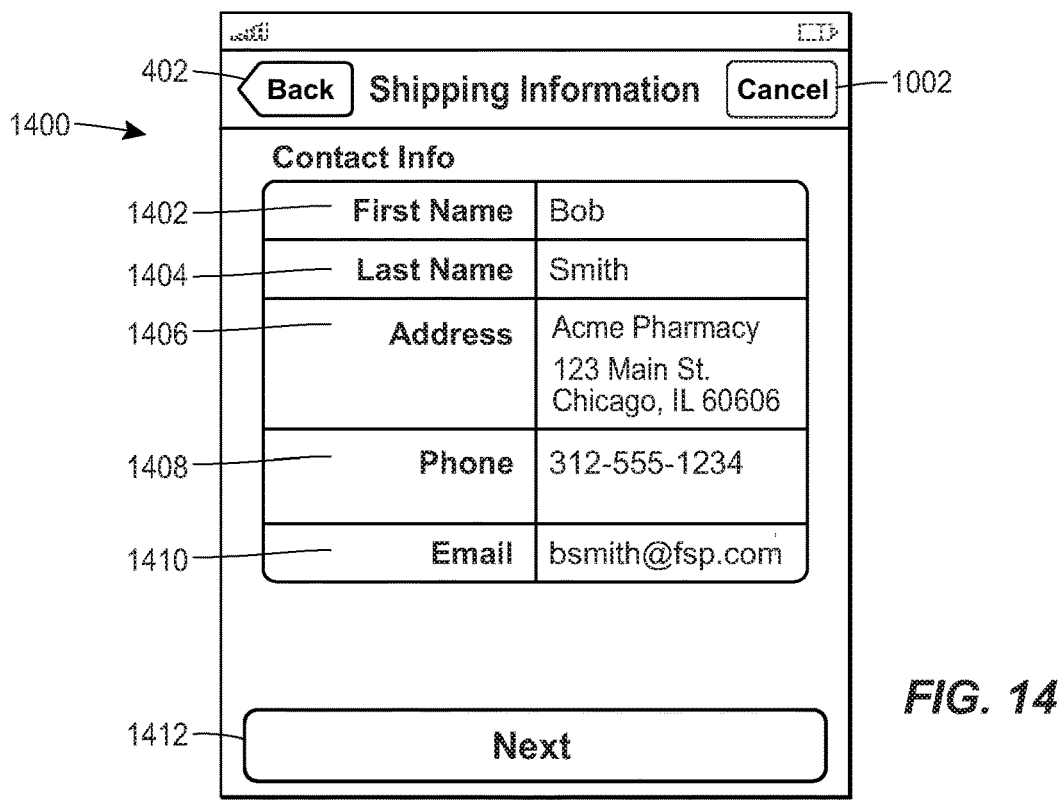
FIG. 14 illustrates a shipping information screen of a client application.

FIG. 14 illustrates a shipping information screen 1400 of a client application 266. The shipping information screen 1400 may include the "Back" selector icon 402 that may cause the client application 266 to navigate back to the order fulfillment screen 1100, the product order information screen 1000, the alternative product source screen 900, the product action source screen 500, the identification tag capture screen 300, and/or the home screen 222. The shipping information screen 1400 may include entry fields for the user to enter biographical information, such as a first name entry field 1402, a last name entry field 1404, an address entry field 1406, a telephone number entry field 1408, and an email address entry field 1410. The client application 266 may associate the entered biographical information with the address to which the order should be shipped. In any event, after the user selects/enters a shipping address, activating the "Next" selector icon 1412 may cause the client application to navigate the user to an action confirmation screen 1500, as shown in FIG. 15, that may be displayed on the client device 216. Further, in some embodiments, such as those described with "one click" ordering, the shipping information screen 1400 may not be displayed to a user because the information is automatically selected based on the scanned identification tag, a user profile, previously provided user preferences comprising a user profile, and/or past orders.

FIG. 15 illustrates an action confirmation screen 1500 of a client application 266. The action confirmation screen 1500 may include the "Back" selector icon 402 that may cause the client application 266 to navigate to and display the shipping information screen 1400, the pick-up location selection screen 1300, the product order information screen 1000 selected product, the alternative product source screen 900, the product action source screen 500, the identification tag capture screen 300, and/or the home screen 222. Moreover, the action confirmation screen 1500 may display biographical information of the user, such as a first name entry field 1502, a last name entry field 1504, a telephone number entry field 1506, and an email address entry field 1508. The client application 266 may associate the entered biographical information with the order so that the retail store may release the order to the appropriate customer. The order action screen 1500 may also include the selected method of fulfillment 1512 that the user selected on the order fulfillment screen 1100 of FIG. 11. The action confirmation screen 1500 may also include an instructional area 1510 that may inform the user of a terms of use agreement or privacy policy information. The user may agree to the terms of use or the privacy policy by clicking a check box, etc. . . . After the user confirms the correctness of the method of fulfillment 1512, and the instructional area 1510, the user may select a "Submit" selector icon 1514 that finalizes and transmits the order/return/review to the proprietary server 202. Further, in some embodiments, such as those described with "one click" ordering, the action confirmation screen 1500 may not be displayed to a user because the information is automatically selected based on the scanned identification tag, a user profile, previously provided user preferences comprising a user profile, and/or past orders.

FIG. 16 illustrates an action confirmation receipt screen 1600 of a client application 266. In response to receiving a confirmation from the proprietary server 202 that the action (i.e., reorder, return, review) successfully was submitted, the client application 266 may display an action confirmation receipt screen 1600, as shown in the FIG. 16, that may be displayed to the user via the client device 216. The action confirmation receipt screen 1600 may include the type of action (i.e., reorder, return, review) 1602, the consumer product 1604, the user's biographical information 1606, and/or the method of fulfillment 1608. The user may select the "Done" selector icon 1610 when finished reviewing the action receipt, and in response, the client application 266 may redirect the user to the home screen 222 of FIG. 2, identification tag capture screen 300 of FIG. 3, etc.

Figure 17:
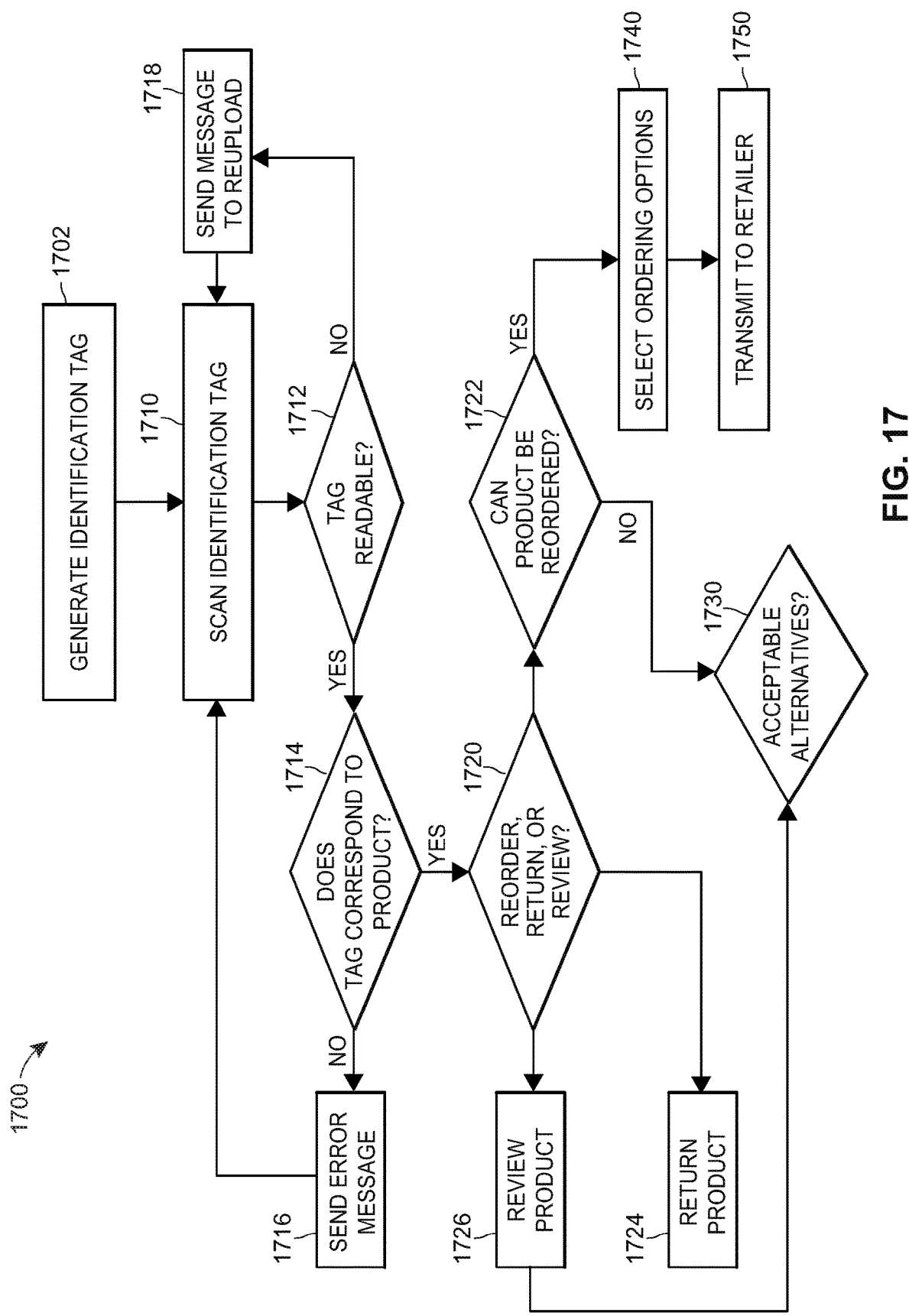
FIG. 17 illustrates a method in which an identification tag corresponding to a consumer product is scanned to initiate a reorder, return, or review of the consumer product.

FIG. 17 illustrates a method 1700 in which an identification tag corresponding to a consumer product is scanned to initiate a reorder, return, or review of the consumer product. The method 1700 may be implemented as described above with FIGS. 1A, 1B, 1C, and 1D. Accordingly, the method 1700 may be partially or completely implemented over a network (e.g., the network 130 of FIG. 1A).

In the method 1700, an identification tag is generated corresponding to a consumer product (Block 1702). A proprietary server (e.g., the proprietary server 202 of FIG. 1B) assigns a unique identification tag corresponding to each consumer product offered for sale by a retailer, and stores the registry in a memory storage (e.g., the database 146 of FIG. 1A). The identification tag may be generated at the time of purchase, when the retailer receives the product from a manufacturer, when the retailer stocks the consumer product in a retail store, and/or at any other time before, during, or after a consumer product is purchased by the user. While in many instances the retailer or a manufacturer will generate the identification tag corresponding to the consumer product, in some embodiments, a user may use a client application (e.g., the client application 266 of FIG. 1D) in order to create/generate an identification tag corresponding to the consumer product.

When a user initiates a purchase of the consumer product, a physical depiction of the identification tag is printed, or otherwise provided to the user. In some embodiments, the physical depiction of the identification tag may be printed at a workstation (e.g., the workstation 128 of FIG. 1A) of a retail store when the user purchases the consumer product at the brick and mortar retail store. In some embodiments, the physical depiction of the identification tag may be printed by the user when the user purchases the consumer product online. In some embodiments, the physical depiction of the identification tag may be printed prior to the user purchasing the consumer product, and a retailer or manufacturer may affix the identification tag to or within the packaging of the consumer, prior to the sale.

At a time after the physical depiction of the identification tag is printed, a client application (e.g., the client application 266 of FIG. 1D) is launched from a client device (e.g., the client device 216 of FIG. 1A) to capture an image of the physical depiction of the identification tag (Block 1710). The client application may display one or more images via a user interface (e.g., the user interface 240 of FIG. 1D) prompting a user to capture an image of the identification tag. The proprietary server may transmit instructions back to the client device that cause the client application to execute an identification tag capture routine (e.g., the identification tag capture routine 272 of FIG. 1D) in order to capture an image of the physical depiction of the identification tag.

After capturing an image of the identification tag, the client application may upload the captured image of the physical depiction of the identification tag to the proprietary server, and the proprietary server may analyze the image to determine if an identification tag can be recognized in the image (Block 1712). To upload and analyze the captured image of the identification tag, the client application and proprietary server may execute an identification tag upload routine (e.g., the identification tag upload routine 274 of FIG. 1D). It should be appreciated that in some embodiments, the client application may analyze the captured image of the identification tag before uploading the captured image to the proprietary server. In analyzing the captured image of the identification tag, the identification tag upload routine may include determining whether the image of the identification tag is of sufficient image quality to identify certain visual indicators, corresponding to the identification tag, that may be depicted in the image. When it is determined that the image is of sufficient image quality, the method 1700 proceeds to block 1714.

When the identification tag upload routine cannot decipher a recognizable identification tag in the captured image of the identification tag, for example because the image is of insufficient quality, the proprietary server may transmit instructions back to the client device that cause the client application to display one or more images indicating that the image could not be processed (Block 1718). In some embodiments, after it is determined that the captured image is of insufficient quality, the client application may display a message requesting a new/different image be uploaded. Further, in some embodiments the message may include instructions for correcting the image (e.g., zooming in, zooming out, tilting to the right, etc.) or for properly capturing an image that is of sufficient quality. Accordingly, the method 1700 may return to block 1710 and repeat blocks 1710 and 1712 so that a different image can be captured, uploaded, and analyzed.

After it is determined that the image of the identification tag is acceptable, the proprietary server then determines what consumer product corresponds to the scanned identification tag (Block 1714). To determine the consumer product represented by the identification tag, the proprietary server may execute an identification tag recognition routine (e.g., the identification tag recognition routine 276 of FIG. 1D) to analyze the captured image of the identification tag to identify a set of visual identifiers that may be depicted in the captured image, such as one or more graphical objects, logos, text, barcodes, labels, and/or the like that are the identification tag itself or correspond to the identification tag. It should be appreciated that the proprietary server may employ any type of image analysis technique, including an object recognition technique(s), in analyzing the captured image of the identification tag. Thus, in analyzing the captured image of the identification tag, the proprietary server may determine whether any identified visual identifiers match or are similar to the visual identifiers for an identification tag stored on the proprietary server. When the proprietary server does not recognize the identification tag and/or cannot locate a corresponding consumer product represented by the identification tag in the image, the proprietary server may cause the client application to transmit a message, via the client device, indicating an error (Block 1716), and the method may return to block 1710 so that a new/different image can be captured, uploaded, and analyzed. When the proprietary server successfully identifies/determines the consumer product represented by the identification tag, the method 1700 proceeds to block 1720.

After the proprietary server identifies the consumer product represented by the scanned identification tag, the proprietary server transmits instructions back to the client device that cause the client application to prompt a user to select an action relating to the identified consumer product (Block 1720). The client application may prompt the user to select between reordering the consumer product, returning the consumer product, or reviewing the consumer product. When the user chooses to reorder the consumer product, the method 1700 proceeds to block 1722. When the user chooses to return the consumer product, the method 1700 proceeds to block 1724. When the user chooses to return the consumer product, the method 1700 proceeds to block 1726.

In response to selecting to reorder the consumer product, the proprietary server may first determine whether the consumer product is available to be reordered (Block 1722). In furtherance of determining whether the consumer product is available to be reordered, the proprietary server may execute a consumer product inventory routine (e.g., the consumer product inventory routine 278 of FIG. 1D). The consumer product inventory routine may correspond to determining whether the retailer still offers the consumer product for sale and the availability to order, pick-up, and/or otherwise fulfill an order of the consumer product. The consumer product inventory routine may determine, for example, which retail locations have the consumer product in stock and available for pick-up, a quantity of the consumer product available to be purchased, whether a warehouse or central order fulfillment facility has the consumer product to fulfill a shipment order, etc. . . . When the proprietary server determines that an order for the consumer product can be fulfilled (e.g., some quantity of the consumer product is available to be purchased), the method 1700 proceeds to block 1740. However, when the proprietary server determines that an order for the consumer product cannot be fulfilled (e.g., the retailer no longer carries the consumer product, the consumer product is out of stock, etc.), the method 1700 proceeds to block 1732.

In response to selecting to return the consumer product, the proprietary server may execute a return consumer product routine (e.g., the return consumer product routine 284 of FIG. 1D) (Block 1724). The return consumer product routine may be configured to initiate a return of the consumer product by processing a return of the consumer product to the retailer so that a user needs to only drop off the consumer product at a designated return location (e.g., a retail store, a kiosk, central fulfillment facility, etc.) or ship the consumer product back to the retailer. In some embodiments, the client application may prompt the user to enter or select from a list/drop down menu, a reason for returning the consumer product in furtherance of processing the routine. In some embodiments, after the proprietary server executes the return consumer product routine, the method 1700 may proceed to block 1730 so that the user may be provided the option to order/purchase one or more other consumers products that are similar/an alternative to the returned consumer product (e.g., a different brand of shampoo) and/or otherwise may be of interest to the user based on the reason provided by the user for returning the consumer product (e.g., a larger size shirt in response to the user providing that the reason for the return was the shirt was too small). In some embodiments, the method 1700 may proceed directly to block 1750 after the proprietary server has executed the return consumer product routine and analyzed the user's review.

In response to selecting to review the consumer product, the proprietary server may transmit instructions back to the client device that cause the client application to prompt a user to provide feedback about the consumer product (Block 1726). The client application may prompt the user to select rating (e.g., between 1 and 5 stars, a grade on the A+ to F scale, a score of 0 to 100, etc.) for the consumer product. In some embodiments, the client application may prompt the user to enter response to specific questions about the consumer product, to provide a written review, or to otherwise provide comments on the consumer product that could be helpful/influence/affect another consumer's decision to purchase the consumer and/or the retailer's interest in continuing to offer the consumer product for sale. In some embodiments, after the user has completed the review of the consumer product, the proprietary server may execute the consumer product review routine (e.g., the consumer product review routine 286 of FIG. 1D) to analyze the user's review in furtherance of determining a next course of action within the method 1700. In some embodiments, when the proprietary server determines that the user's review was generally positive or favorable for the reviewed consumer product, the method 1700 may proceed to block 1722 so that the user has the option to reorder the product. In some embodiments, when the proprietary server determines that the user's review was generally positive or favorable for the reviewed consumer product, the method 1700 may proceed to block 1730 so that the user may be provided the option to order/purchase one or more other consumers products that are similar to the reviewed consumer product (e.g., a different brand of shampoo and/or difference size of shampoo), often purchased by other consumers at the same time/in-conjunction with the reviewed consumer product (e.g., conditioner with shampoo), and/or otherwise may be of interest to the user based on the feedback provided for the consumer product (e.g., a larger bottle of shampoo in response to the user commenting how quickly he/she used the reviewed bottle of shampoo). In some embodiments, when the proprietary server determines that the user's review was generally negative or unfavorable for the reviewed consumer product, the method 1700 may proceed to block 1730 so that the user may be provided the option to order/purchase one or more other consumers products that are similar/an alternative to the reviewed consumer product (e.g., a different brand of shampoo) and/or otherwise may be of interest to the user based on the feedback provided for the consumer product (e.g., a less expensive shampoo in response to feedback that the reviewed shampoo was too expensive). In some embodiments, the method 1700 may proceed directly to block 1750 after the proprietary server has executed the consumer product review routine 286 and analyzed the user's review.

After the proprietary server determines that the consumer product cannot be reordered, a return of the consumer product has been initiated, or a review of the consumer product has been submitted, the proprietary server may offer the one or more alternative consumers products to the user (Block 1730). The proprietary server may execute an alternative product identification routine (e.g., the alternative product identification routine 282 of FIG. 1D) to determine one or more alternative consumer products to offer the user to order/purchase in place of or in addition to the consumer product represented by the scanned identification tag. When the user selects to order the alternative product, the method 1700 proceeds to block 1740. When the user selects to not order the alternative product, the method 1700 proceeds to block 1750.

After selecting to reorder order the consumer product and/or an alternative provide, the proprietary server may cause the client application to transmit one or more prompts to a user, via the client device, to select one or more settings corresponding to fulfilling an order (Block 1740). In some embodiments, for example, a user may select a fulfillment method (e.g., to pick-up the order from a location at which the product is in stock, to pick-up from a location at which the product is not in stock but to which the product will be shipped and can be picked-up by the user, having the order shipped to the user, etc.), a quantity of the products to purchase, the size of the products to purchase, and/or any other settings pertaining to fulfilling an order of one or more consumer products. In determining available fulfillment methods, the client application may execute a location awareness application (e.g., the location awareness application 288 of FIG. 1D) that coordinates with a GPS unit of the client device (e.g., the GPS unit 244 of FIG. 1D) to geolocate the current location of the client device. The location awareness application may be utilized to determine the closest pick-up location at which the contents of the order are in stock and available, the closest pick-up location at which the contents of the order can be shipped to and picked-up by the user, or a location to which the order can be delivered. In response to receiving a selection of the order settings, the client application may determine whether a default pick-up retail store has been selected. The default pick-up retail store may be a retail store that the user most often frequents, a retail store that is closest to the user's home or work, a retail store that historically carries the consumer product, etc. If the current location of the client device is available, the client application may determine a list of proximal retail stores to the current location and may display only the retail stores that include the shortest distance to the current location of the client device and/or those retail stores that have the consumer product in stock and/or available for pick-up. If the current location is not available, the client application may only receive address information from the user, such as receiving an address information, either contained in a user profile or manually entered by the user via an address field prompt on a retail store selection screen. In some embodiments, using the location associated with the entered address information, the client application may determine a list of proximal retails stores to the location associated with the entered address information and may display only the retail stores that include the shortest distance to the location associated with the entered address information and/or those retail stores that have the consumer product in stock and/or available for pick-up. The user may select a desired retail store from the displayed retail stores via a retail store selector icon.

Once the order settings have been selected, the return forms have been completed, or the review has been completed, the client application may submit the order, return request, and/or review to the proprietary server (Block 1750). In some embodiments, when the order, return request, or review is successfully received by the proprietary server, the client application may receive a message indicative of an order, return, or review receipt/confirmation, and may display the receipt to the user. In embodiments, the receipt may be e-mailed, texted, or otherwise electronically transmitted to the user.

Figure 18:
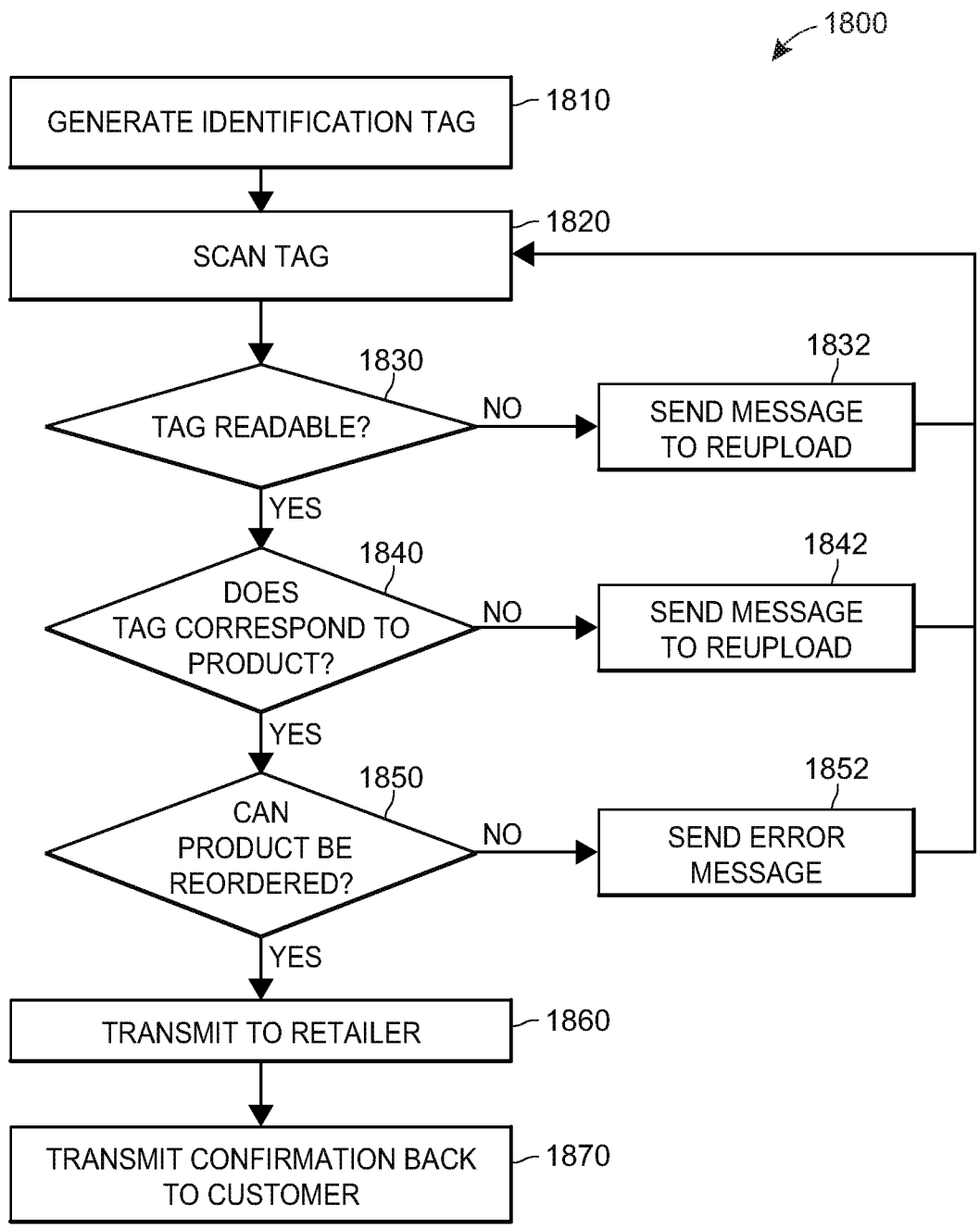
FIG. 18 illustrates a method in which an identification tag corresponding to a consumer product is scanned to initiate one click reordering of the consumer product.

FIG. 18 illustrates a method 1800 in which an identification tag corresponding to a consumer product is scanned to initiate one click reordering of the consumer product. The method 1800 may be implemented as described above with FIGS. 1A, 1B, 1C, and 1D. Accordingly, the method 1800 may be partially or completely implemented over a network (e.g., the network 130 of FIG. 1A).

In the method 1800, an identification tag is generated corresponding to a consumer product (Block 1810). A proprietary server (e.g., the proprietary server 202 of FIG. 1B) assigns a unique identification tag corresponding to each consumer product offered for sale by a retailer, and stores the registry in a memory storage (e.g., the database 146 of FIG. 1A).

The identification tag may be generated at the time of purchase, when the retailer receives the product from a manufacturer, when the retailer stocks the consumer product in a retail store, and/or at any other time before, during, or after a consumer product is purchased by the user. While in many instances the retailer or a manufacturer will generate the identification tag corresponding to the consumer product, in some embodiments, a user may use a client application (e.g., the client application 266 of FIG. 1D) in order to create/generate an identification tag corresponding to the consumer product.

When a user initiates a purchase of the consumer product, a physical depiction of the identification tag is printed, generated, created, or otherwise provided to the user. In some embodiments, the physical depiction of the identification tag may be printed at a workstation (e.g., the workstation 128 of FIG. 1A) of a retail store when the user purchases the consumer product at the brick and mortar retail store. In some embodiments, the physical depiction of the identification tag may be printed by the user when the user purchases the consumer product online. In some embodiments, the physical depiction of the identification tag may be printed prior to the user purchasing the consumer product, and a retailer or manufacturer may affix the identification tag to or within the packaging of the consumer, prior to the sale.

At a time after the physical depiction of the identification tag is printed, a client application (e.g., the client application 266 of FIG. 1D) is launched from a client device (e.g., the client device 216 of FIG. 1A) (Block 1820). The client application may display one or more images via a user interface (e.g., the user interface 240 of FIG. 1D) prompting a user to capture an image of the identification tag. The proprietary server may transmit instructions back to the client device that cause the client application to execute an identification tag capture routine (e.g., the identification tag capture routine 272 of FIG. 1D) in order to capture an image of the physical depiction of the identification tag.

After capturing an image of the identification tag, the client application may upload the captured image of the physical depiction of the identification tag to the proprietary server, and the proprietary server may analyze the image to determine if an identification tag can be recognized in the image (Block 1830). To upload and analyze the captured image of the identification tag, the client application and proprietary server may execute an identification tag upload routine (e.g., the identification tag upload routine 274 of FIG. 1D). It should be appreciated that in some embodiments, the client application may analyze the captured image of the identification tag before uploading the captured image to the proprietary server. In analyzing the captured image of the identification tag, the identification tag upload routine may include determining whether the image of the identification tag is of sufficient image quality to identify certain visual indicators, corresponding to the identification tag, that may be depicted in the image. When it is determined that the image is of sufficient image quality, the method 1800 proceeds to block 1814.

When the identification tag upload routine cannot decipher a recognizable identification tag in the captured image of the identification tag, for example because the image is of insufficient quality, the proprietary server may transmit instructions back to the client device that cause the client application to display one or more images indicating that the image could not be processed (block 1832). In some embodiments, after it is determined that the captured image is of insufficient quality, the client application may display a message requesting a new/different image be uploaded. Further, in some embodiments the message may include instructions for correcting the image (e.g., zooming in, zooming out, tilting to the right, etc.) or for properly capturing an image that is of sufficient quality. Accordingly, the method 1800 may return to block 1820 and repeat blocks 1820 and 1830 so that a different image can be captured, uploaded, and analyzed.

After it is determined that the image of the identification tag is acceptable, the proprietary server then determines what consumer product corresponds to the scanned identification tag (Block 1840). To determine the consumer product represented by the identification tag, the proprietary server may execute an identification tag recognition routine (e.g., the identification tag recognition routine 276 of FIG. 1D) to analyze the captured image of the identification tag to identify a set of visual identifiers that may be depicted in the captured image, such as one or more graphical objects, logos, text, barcodes, labels, and/or the like that are the identification tag itself or correspond to the identification tag. It should be appreciated that the proprietary server may employ any type of image analysis technique, including an object recognition technique(s), in analyzing the captured image of the identification tag. Thus, in analyzing the captured image of the identification tag, the proprietary server may determine whether any identified visual identifiers match or are similar to the visual identifiers for an identification tag stored on the proprietary server or in a database. When the proprietary server does not recognize the identification tag and/or cannot locate corresponding consumer product represented by the identification tag in the image, the proprietary server may cause the client application to transmit a message, via the client device, indicating an error (Block 1842), and the method may return to block 1820 so that a new/different image can be captured, uploaded, and analyzed. When the proprietary server determines the consumer product represented by the identification tag, the method 1800 proceeds to block 1850.

In response to determining the consumer product represented by the identification tag, the proprietary server may determine whether the consumer product is available to be reordered (Block 1850). In furtherance of determining whether the consumer product is available to be reordered, the proprietary server may execute a consumer product inventory routine (e.g., the consumer product inventory routine 278 of FIG. 1D). The consumer product inventory routine may correspond to determining whether the retailer still offers the consumer product for sale and the availability to order, pick-up, and/or otherwise fulfill an order of the consumer product. The consumer product inventory routine may determine, for example, which retail locations have the consumer product in stock and available for pick-up, a quantity of the consumer product available to be purchased, whether a warehouse or central order fulfillment facility has the consumer product to fulfill a shipment order, etc. . . . When the proprietary server determines that an order for the consumer product can be fulfilled (e.g., some quantity of the consumer product is available to be purchased), the method 1800 proceeds to block 1860. However, when the proprietary server determines that an order for the consumer product cannot be fulfilled (e.g., the retailer no longer carries the consumer product, the consumer product is out of stock, etc.), the method 1800 proceeds to block 1852.

After the proprietary server determines a reorder for the consumer product can be fulfilled, the proprietary server transmits instructions back to the client device that cause the client application to prompt a user to confirm the reorder of the consumer product (Block 1860). When the user confirms the reorder of the consumer product, the client application transmits the request to the proprietary server, and the method 1800 proceeds to block 1870. In some embodiments, when the user chooses to not reorder the consumer product, the method 1800 may proceed back to block 1820 to scan a different identification tag.

In some embodiments, after selecting to reorder order the consumer product, the proprietary server may cause the client application to transmit one or more prompts to a user, via the client device, to select one or more settings corresponding to fulfilling an order. In some embodiments, for example, a user may select a fulfillment method (e.g., to pick-up the order from a location at which the product is in stock, to pick-up from a location at which the product is not in stock but to which the product will be shipped and can be picked-up by the user, having the order shipped to the user, etc.), a quantity of the products to purchase, the size of the products to purchase, and/or any other settings pertaining to fulfilling an order of one or more consumer products. In determining available fulfillment methods, the client application may execute a location awareness application (e.g., the location awareness application 288 of FIG. 1D) that coordinates with a GPS unit of the client device (e.g., the GPS unit 244 of FIG. 1D) to geo-locate the current location of the client device. The location awareness application may be utilized to determine the closest pick-up location at which the contents of the order are in stock and available, the closest pick-up location at which the contents of the order can be shipped to and picked-up by the user, or a location to which the order can be delivered. In response to receiving a selection of the order settings, the client application may determine whether a default pick-up retail store has been selected. The default pick-up retail store may be a retail store that the user most often frequents, a retail store that is closest to the user's home or work, a retail store that historically carries the consumer product, etc. . . . If the current location of the client device is available, the client application may determine a list of proximal retail stores to the current location and may display only the retail stores that include the shortest distance to the current location of the client device and/or those retail stores that have the consumer product in stock and/or available for pick-up. If the current location is not available, the client application may only receive address information from the user, such as receiving an address information, either contained in a user profile or manually entered by the user via an address field prompt on a retail store selection screen. In some embodiments, using the location associated with the entered address information, the client application may determine a list of proximal retails stores to the location associated with the entered address information and may display only the retail stores that include the shortest distance to the location associated with the entered address information and/or those retail stores that have the consumer product in stock and/or available for pick-up. The user may select a desired retail store from the displayed retail stores via a retail store selector icon. Once the order settings have been selected, the client application may transmit/submit the order to the proprietary (Block 1860).

Conversely, in some embodiments, the user does not need to select any fulfillment settings, because preferred fulfillment settings associated with the user were previously selected, automatically detected/determined using machine learning techniques, or otherwise selected/determined and saved to the client application/proprietary server. In such embodiments, when the user selects to confirm the reordering of the consumer product, the order is transmitted to the proprietary server with the previously selected/preferred fulfillment settings automatically applied to the order. In such embodiments, the consumer product is configured to be reordered conveniently and quickly using "just one click" by merely capturing an image of the identification tag and confirming the reorder of the consumer product, thereby enabling "one click reordering." After the user confirms the reorder, the method 1800 may proceed to block 1870.

When the proprietary server determines that the consumer product cannot be reordered the proprietary server may cause the client application to transmit a message, via the client device, indicating that the consumer product cannot be reordered (Block 1852). In some embodiments, the proprietary server may execute the alternative product identification routine (e.g., the alternative product identification routine 282 of FIG. 1D) to determine one or more alternative consumer products to offer the user to order/purchase in place of the consumer product. The alternative product identification routine may be configured to analyze the inventory of a retailer, a purchases history of a user, a return history of a user, past purchases of other users, consumer product reviews submitted by the user or other uses, and/or other data that may enable the proprietary server to determine one or more alternative products to offer the user to order/purchase as a replacement for the consumer product. In such embodiments, the method 1800 may proceed in a manner similar to Blocks 1730-1750 of the method 1700, to complete the order/purchase of the alternative product.

In some embodiments, after the order is successfully received by the proprietary server, the client application may receive a message indicative of an order receipt/confirmation, and may display the receipt to the user (Block 1870). In embodiments, the receipt may be e-mailed, texted, or otherwise electronically transmitted to the user.

In some embodiments, merely capturing an image of the identification tag and uploading the image to the proprietary server may initiate a request to reorder the consumer product represented by the scanned identification tag.

In some embodiments, the identification tag, the one or more alternative products, and/or the order fulfillment settings may be generated, identified, detected and/or otherwise determined using machine learning techniques, such as cognitive learning, deep learning, combined learning, heuristic engines and algorithms, and/or pattern recognition techniques. For example, the proprietary server, the client application, a processor, etc. may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, video, audio, mobile device, retailer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the retailer database, a third-party database, and/or other data.

In one embodiment, a processor (and/or machine learning or heuristic engine or algorithm discussed herein) may be trained by providing it with a large sample of consumer product orders and/or user data with known characteristics or features, such as historical product order data, consumer product review data, and/or past return data. Based upon these analyses, the processing element may learn how to identify characteristics and patterns that may then be applied to analyzing user device details, user device sensors, geolocation information, image data, the retailer database, a third-party database, and/or other data. For example, the processing element may learn, with the user's permission or affirmative consent, to identify a consumer product and/or identification tag, and/or learn to identify user characteristics, habits, and/or preferences.

Although the above text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A method of reordering consumer products, comprising:
    receiving, by one or more processors via a communications network and from a client device, an image of a physical depiction of an identification tag;
    determining, by the one or more processors, a consumer product that corresponds to the identification tag via at least one of: (i) optical character recognition, (ii) universal resource identifier decoding, (iii) object recognition, (iv) quick response code decoding, or (v) barcode decoding;
    identifying, by the one or more processors, from a plurality of fulfillment locations, a retail location, wherein the consumer product is not currently in stock at the retail location and is expected to be in stock and available for pick-up at the retail location in the future and wherein determining that the consumer product is not currently in stock and is expected to be in stock and available for pick-up at the retail location in the future is based on at least a portion of shipping data associated with the plurality of fulfillment locations; and
    automatically initiating, by the one or more processors, reordering of the consumer product at the retail location.

2. The method of claim 1, wherein the retail location is further determined based on location data that at least one of: (i) corresponds to a location of the client device, or (ii) is obtained at the client device via a user indication.

3. The method of claim 1, wherein:
    the consumer product that corresponds to the identification tag is an alternative product to an unavailable product, and
    the method further comprises determining, via the one or more processors, the alternative product to the unavailable product.

4. The method of claim 1, further comprising:
    causing, by the one or more processors, the client device to launch a graphical user interface indicating: (i) an identification of the retail location, (ii) a distance from a location of the client device to the retail location, and (iii) a pick-up time at which the consumer product is expected to be in stock and available for pick-up at the retail location based on at least a portion of the shipping data associated with the retail location.

5. The method of claim 1, further comprising:
    receiving, at the one or more processors from the client device, a selection to reorder the consumer product, wherein the client device prompts a user to select one of: reordering, returning, or reviewing the consumer product.

6. The method of claim 1, wherein initiating the reordering of the consumer product at the retail location includes either: (i) preparing the consumer product for pick-up at the retail location, or (ii) shipping the consumer product from the retail location to an address.

7. The method of claim 1, further comprising:
    in response to determining the consumer product that corresponds to the identification tag, prompting, by the one or more processors, a user of the client device to review the consumer product.

8. A system comprising a proprietary server connected to a host network, the proprietary server including:
- one or more databases storing a plurality of identification tags linked with a plurality of consumer products;
- a link via which the system is communicatively connected with a client device, the client device including an identification tag capture routine configured to capture an image of a physical depiction of an identification tag; and
- one or more processors configured to:
  - receive, from the client device, an image of a physical depiction of an identification tag,
  - determine a consumer product that corresponds to the identification tag via the one or more databases and at least one of: (i) optical character recognition, (ii) universal resource identifier decoding, (iii) object recognition, (iv) quick response code decoding, or (v) barcode decoding,
  - identify a retail location, from a plurality of fulfillment locations, wherein the consumer product is not currently in stock at the retail location and is expected to be in stock and available for pick-up at the retail location in the future and wherein determining that the consumer product is not currently in stock and is expected to be in stock and available for pick-up at the retail location in the future is based on at least a portion of shipping data associated with the plurality of fulfillment locations, and
  - automatically initiate reordering of the consumer product at the retail location.

9. The system of claim 8, wherein the retail location is further determined based on location data that at least one of: (i) corresponds to a location of the client device, or (ii) is obtained at the client device via a user indication.

10. The system of claim 8, wherein:
- the consumer product that corresponds to the identification tag is an alternative product to an unavailable product, and
- the one or more processors are further configured to determine the alternative product to the unavailable product.

11. The system of claim 8, wherein the one or more processors are further configured to:
- cause the client device to launch a graphical user interface indicating (i) an identification of the retail location, (ii) a distance from a location of the client device to the retail location, and (iii) a pick-up time at which the consumer product is expected to be in stock and available for pick-up at the retail location based on at least a portion of the shipping data associated with the retail location.

12. The system of claim 8, wherein the one or more processors are further configured to:
- receive, from the client device, a selection to reorder the consumer product, wherein the client device prompts a user to select one of: reordering, returning, or reviewing the consumer product.

13. The system of claim 8, wherein initiating the reordering of the consumer product at the retail location includes either: (i) preparing the consumer product for pick-up at the retail location or (ii) shipping the consumer product from the retail location to an address.

14. One or more non-transitory computer-readable storage media having stored thereon a set of instructions that, when executed by one or more processors, cause the one or more processors to:
- receive, via a communications network and from a client device, an image of a physical depiction of an identification tag;
- determine a consumer product that corresponds to the identification tag via at least one of: (i) optical character recognition, (ii) universal resource identifier decoding, (iii) object recognition, (iv) quick response code decoding, or (v) barcode decoding;
- identify a retail location, from a plurality of fulfillment locations, wherein the consumer product is not currently in stock at the retail location and is expected to be in stock and available for pick-up at the retail location in the future and wherein determining that the consumer product is not currently in stock and is expected to be in stock and available for pick-up at the retail location in the future is based on at least a portion of shipping data associated with the plurality of fulfillment locations; and
- automatically initiate reordering of the consumer product at the retail location.

15. The non-transitory computer-readable storage media of claim 14, wherein:
- the consumer product that corresponds to the identification tag is an alternative product to an unavailable product, and
- the instructions, when executed by the one or more processors, further cause the one or more processors to determine the alternative product to the unavailable product.

16. The non-transitory computer-readable storage media of claim 14, further including instructions that, when executed by the one or more processors, cause the one or more processors to:
- cause the client device to launch a graphical user interface indicating (i) an identification of the retail location, (ii) a distance from a location of the client device to the retail location, and (iii) a pick-up time at which the consumer product is expected to be in stock and available for pick-up at the retail location based on at least a portion of the shipping data associated with the retail location.

17. The non-transitory computer-readable storage media of claim 14, further including instructions that, when executed by the one or more processors, cause the one or more processors to:
- receive, from the client device, a selection to reorder the consumer product, wherein the client device prompts a user to select one of: reordering, returning, or reviewing the consumer product.

* * * * *